US008435315B2

(12) United States Patent
Tsangaris et al.

(10) Patent No.: US 8,435,315 B2
(45) Date of Patent: May 7, 2013

(54) HORIZONTALLY-ORIENTED GASIFIER WITH LATERAL TRANSFER SYSTEM

(75) Inventors: Andreas Tsangaris, Ottawa (CA); Kenneth Craig Campbell, Kitchener (CA); Mao Pei Cui, Ottawa (CA); Geoffrey Dobbs, Kinburn (CA); Douglas Michael Feasby, Sherwood Park (CA); Zhiyuan Shen, Ottawa (CA)

(73) Assignee: Plasco Energy Group Inc., Kanata (CA)

( * ) Notice: Subject to any disclaimer, the term of this patent is extended or adjusted under 35 U.S.C. 154(b) by 926 days.

(21) Appl. No.: 11/745,427

(22) Filed: May 7, 2007

(65) Prior Publication Data

US 2007/0266634 A1 Nov. 22, 2007

Related U.S. Application Data

(60) Provisional application No. 60/911,179, filed on Apr. 11, 2007, provisional application No. 60/864,116, filed on Nov. 2, 2006, provisional application No. 60/798,439, filed on May 5, 2006, provisional application No. 60/797,973, filed on May 5, 2006.

(30) Foreign Application Priority Data

Jun. 5, 2006 (WO) ................ PCT/CA2006/000881

(51) Int. Cl.
*C10B 1/00* (2006.01)
*C01B 3/36* (2006.01)
*C01B 6/24* (2006.01)

(52) U.S. Cl.
USPC .................... 48/89; 48/61; 48/101; 48/197 R; 423/644

(58) Field of Classification Search ................ 48/61, 73, 48/77; 423/644
See application file for complete search history.

(56) References Cited

U.S. PATENT DOCUMENTS

| 2,062,762 A | 12/1936 | Preston |
| 3,622,493 A | 11/1971 | Crusco |

(Continued)

FOREIGN PATENT DOCUMENTS

| CA | 1134208 A | 10/1982 |
| CA | 2106746 | 1/2000 |

(Continued)

OTHER PUBLICATIONS

Joint Meeting of Corporate Services and Economic Development Committee and Planning and Environment Committee, *Evaluation Project—Plasma Waste Conversion*, Doc. ACS2005-CMR-OCM-0012, (Ottawa: Sep. 7, 2005), online:<http://ottawa.ca/calendar/ottawa/citycouncil/occ/2005/09-28/csedc/ACS2005-CMR-OCM-0012>.

(Continued)

*Primary Examiner* — Matthew Merkling
(74) *Attorney, Agent, or Firm* — K&L Gates LLP

(57) ABSTRACT

A method and apparatus is described for the efficient conversion of carbonaceous feedstock including municipal solid waste into a product gas through gasification. More specifically, a horizontally-oriented gasifier having one or more lateral transfer system for moving material through the gasifier is provided thereby allowing for the horizontal expansion of the gasification process such that there is sequential promotion of feedstock drying, volatization and char-to-ash conversions.

21 Claims, 32 Drawing Sheets

U.S. PATENT DOCUMENTS

| | | | |
|---|---|---|---|
| 3,692,505 A | 9/1972 | Reichl | |
| 3,725,020 A | 4/1973 | Slater et al. | |
| 3,779,182 A | 12/1973 | Camacho | |
| 3,801,469 A | 4/1974 | Essenhigh | |
| 3,804,606 A | 4/1974 | Archer et al. | |
| 3,941,065 A | 3/1976 | Albrecht | |
| 3,991,557 A | 11/1976 | Donath | |
| 4,007,786 A | 2/1977 | Schlinger | |
| 4,028,068 A | 6/1977 | Kiener | |
| 4,063,521 A | 12/1977 | Pech | |
| 4,141,694 A | 2/1979 | Camacho | 48/61 |
| 4,172,425 A | 10/1979 | Sheridan | |
| 4,181,504 A | 1/1980 | Camacho | 48/197 R |
| 4,208,191 A | 6/1980 | Sze | 48/210 |
| 4,229,184 A | 10/1980 | Gregg | |
| 4,272,255 A | 6/1981 | Coates | 48/63 |
| 4,291,636 A | 9/1981 | Bergsten et al. | |
| 4,399,314 A | 8/1983 | Child | |
| 4,400,179 A | 8/1983 | Marion et al. | |
| 4,410,336 A | 10/1983 | Blaskowski | 48/210 |
| 4,472,172 A | 9/1984 | Sheer et al. | 48/202 |
| 4,479,443 A | 10/1984 | Faldt et al. | |
| 4,489,562 A | 12/1984 | Snyder et al. | |
| 4,495,873 A | 1/1985 | Blankenship | |
| 4,534,301 A | 8/1985 | Sakash et al. | |
| 4,543,940 A | 10/1985 | Krill et al. | |
| 4,606,799 A | 8/1986 | Pirklbauer et al. | 204/170 |
| 4,644,877 A | 2/1987 | Barton et al. | |
| 4,656,956 A | 4/1987 | Flickinger et al. | |
| 4,666,462 A | 5/1987 | Martin | |
| 4,676,805 A | 6/1987 | Richter et al. | |
| 4,701,185 A | 10/1987 | Eckstein | |
| 4,749,383 A * | 6/1988 | Mansfield et al. | 48/202 |
| 4,831,944 A | 5/1989 | Durand et al. | |
| 4,838,898 A | 6/1989 | Mifflin et al. | |
| 4,881,947 A | 11/1989 | Parker et al. | |
| 4,900,429 A | 2/1990 | Richardson | |
| 4,941,415 A | 7/1990 | Pope et al. | |
| 4,960,380 A | 10/1990 | Cheetham | |
| 4,989,522 A | 2/1991 | Cline et al. | |
| 5,010,829 A | 4/1991 | Kulkarni | |
| 5,062,372 A | 11/1991 | Ritter | |
| 5,065,206 A | 11/1991 | Nishizawa et al. | |
| 5,081,940 A | 1/1992 | Motomura et al. | |
| 5,095,825 A | 3/1992 | Arpalahti et al. | |
| 5,095,828 A | 3/1992 | Holden et al. | |
| 5,101,739 A | 4/1992 | Nance et al. | |
| 5,136,137 A | 8/1992 | Schlienger | |
| 5,195,449 A | 3/1993 | Michimae | 110/257 |
| 5,279,234 A * | 1/1994 | Bender et al. | 110/210 |
| 5,280,757 A | 1/1994 | Carter et al. | |
| 5,288,969 A | 2/1994 | Wong et al. | |
| 5,295,449 A | 3/1994 | Maeda et al. | |
| 5,319,176 A | 6/1994 | Alvi et al. | |
| 5,323,717 A | 6/1994 | Gaskin et al. | 110/291 |
| 5,331,906 A | 7/1994 | Sonoda et al. | 110/264 |
| 5,361,709 A | 11/1994 | Eshleman | |
| 5,388,535 A | 2/1995 | Eshleman | 110/255 |
| 5,410,121 A | 4/1995 | Schlienger | |
| 5,417,170 A | 5/1995 | Eshleman | |
| 5,477,790 A | 12/1995 | Foldyna et al. | |
| 5,486,269 A | 1/1996 | Nilsson | 162/31 |
| 5,541,386 A | 7/1996 | Alvi et al. | |
| 5,544,597 A | 8/1996 | Camacho | |
| 5,579,705 A | 12/1996 | Suzuki et al. | |
| 5,634,281 A | 6/1997 | Nugent | |
| 5,666,891 A | 9/1997 | Titus et al. | 110/250 |
| 5,694,868 A * | 12/1997 | Mitthof | 110/210 |
| 5,727,903 A | 3/1998 | Borray et al. | |
| 5,756,957 A | 5/1998 | Titus et al. | 219/121.38 |
| 5,785,923 A | 7/1998 | Surma et al. | 266/144 |
| 5,798,497 A | 8/1998 | Titus et al. | 219/121.37 |
| 5,865,206 A | 2/1999 | Steigman et al. | |
| 5,871,348 A | 2/1999 | Terry et al. | |
| 5,877,394 A | 3/1999 | Kujawa et al. | |
| 5,908,564 A | 6/1999 | Titus et al. | |
| 5,937,652 A | 8/1999 | Abdelmalek | |
| 5,944,034 A | 8/1999 | McRae et al. | |
| 5,958,264 A | 9/1999 | Tsantrizos et al. | |
| 6,066,825 A | 5/2000 | Titus et al. | |
| 6,084,139 A | 7/2000 | Van Der Giessen et al. | |
| 6,084,147 A | 7/2000 | Mason | |
| 6,089,169 A | 7/2000 | Comiskey | |
| 6,112,677 A | 9/2000 | Kuntschar et al. | |
| 6,155,182 A | 12/2000 | Tsangaris et al. | |
| 6,182,584 B1 | 2/2001 | Gaudio | |
| 6,200,430 B1 | 3/2001 | Robert | 204/164 |
| 6,215,678 B1 | 4/2001 | Titus et al. | 363/126 |
| 6,245,309 B1 | 6/2001 | Etievant et al. | |
| 6,250,236 B1 | 6/2001 | Feizollahi | |
| 6,269,286 B1 | 7/2001 | Tse et al. | |
| 6,279,494 B1 | 8/2001 | Jimbo et al. | |
| 6,380,507 B1 | 4/2002 | Childs | 219/121.37 |
| 6,394,042 B1 | 5/2002 | West | |
| 6,485,296 B1 * | 11/2002 | Bender et al. | 432/58 |
| 6,630,113 B1 | 10/2003 | Surma | 422/199 |
| 6,686,556 B2 | 2/2004 | Mitchell | 219/121.48 |
| 6,810,821 B2 | 11/2004 | Chan | 110/345 |
| 6,817,388 B2 | 11/2004 | Tsangaris et al. | 141/82 |
| 6,837,910 B1 | 1/2005 | Yoshikawa et al. | |
| 6,863,268 B2 | 3/2005 | Zhang | |
| 6,887,284 B2 | 5/2005 | Hudson | |
| 6,960,234 B2 | 11/2005 | Hassett | |
| 6,971,323 B2 | 12/2005 | Capote et al. | |
| 7,465,843 B2 | 12/2008 | Gnedenko et al. | |
| 2001/0047614 A1 | 12/2001 | Swanepoel et al. | |
| 2002/0088236 A1 | 7/2002 | Arar et al. | |
| 2002/0103407 A1 | 8/2002 | Hatanaka | |
| 2002/0144981 A1 | 10/2002 | Mitchell | 219/121.44 |
| 2003/0022035 A1 | 1/2003 | Galloway | |
| 2003/0070808 A1 | 4/2003 | Allison | |
| 2003/0192609 A1 | 10/2003 | Enerson | |
| 2003/0209174 A1 | 11/2003 | Chan | |
| 2003/0233788 A1 | 12/2003 | Lewis | |
| 2004/0031424 A1 | 2/2004 | Pope | |
| 2004/0060236 A1 | 4/2004 | Yoshikawa et al. | |
| 2004/0063798 A1 | 4/2004 | Erikstrup et al. | |
| 2004/0170210 A1 | 9/2004 | Do et al. | |
| 2004/0244289 A1 | 12/2004 | Morozumi et al. | |
| 2004/0245086 A1 | 12/2004 | Steynberg et al. | |
| 2004/0247509 A1 | 12/2004 | Newby | |
| 2004/0251241 A1 | 12/2004 | Blutke et al. | 219/121.59 |
| 2005/0109603 A1 | 5/2005 | Graham | |
| 2005/0166810 A1 | 8/2005 | Gnedenko et al. | |
| 2005/0256212 A1 | 11/2005 | Norbeck et al. | |
| 2005/0256592 A1 | 11/2005 | Martens | |
| 2006/0042999 A1 | 3/2006 | Iqbal et al. | |
| 2006/0228294 A1 | 10/2006 | Davis et al. | |
| 2007/0006528 A1 | 1/2007 | Diebold et al. | |
| 2007/0012229 A1 | 1/2007 | Rehmat et al. | |
| 2007/0045155 A1 | 3/2007 | Selmen et al. | |
| 2007/0258869 A1 | 11/2007 | Tsangaris et al. | |
| 2007/0266632 A1 | 11/2007 | Tsangaris et al. | |
| 2007/0266633 A1 | 11/2007 | Tsangaris et al. | |
| 2007/0272131 A1 | 11/2007 | Carabin et al. | |
| 2007/0284453 A1 | 12/2007 | Tsangaris et al. | |
| 2007/0289216 A1 | 12/2007 | Tsangaris et al. | |
| 2008/0104887 A1 | 5/2008 | Tsangaris et al. | |
| 2008/0147241 A1 | 6/2008 | Tsangaris et al. | |
| 2008/0202028 A1 | 8/2008 | Tsangaris et al. | |
| 2008/0209807 A1 | 9/2008 | Tsangaris et al. | |
| 2008/0210089 A1 | 9/2008 | Tsangaris et al. | |
| 2008/0222956 A1 | 9/2008 | Tsangaris et al. | |
| 2008/0277265 A1 | 11/2008 | Tsangaris et al. | |
| 2009/0020456 A1 | 1/2009 | Tsangaris et al. | |
| 2010/0154304 A1 | 6/2010 | Tsangaris et al. | |
| 2010/0275781 A1 | 11/2010 | Tsangaris et al. | |
| 2011/0036014 A1 | 2/2011 | Tsangaris et al. | |
| 2011/0062013 A1 | 3/2011 | Tsangaris et al. | |
| 2011/0078952 A1 | 4/2011 | Tsangaris et al. | |

FOREIGN PATENT DOCUMENTS

| | | |
|---|---|---|
| CA | 2343035 | 3/2000 |
| CA | 2349608 | 5/2000 |
| CA | 2332685 | 9/2001 |
| CA | 2457075 | 2/2003 |
| CA | 2407102 | 4/2003 |

| | | |
|---|---|---|
| CA | 2396438 A1 | 7/2003 |
| CA | 2484472 | 11/2003 |
| CA | 2424805 | 10/2004 |
| CA | 2501841 | 9/2005 |
| CA | 2559875 | 10/2005 |
| CA | 2610806 | 12/2006 |
| CA | 2610808 | 12/2006 |
| CA | 2637779 A1 | 8/2007 |
| CA | 2714911 | 1/2008 |
| CA | 2716912 | 9/2008 |
| CN | 1258712 | 7/2000 |
| CN | 1382202 | 11/2002 |
| CN | 1644661 | 7/2005 |
| DE | 19652770 | 6/1998 |
| DE | 19916931 | 10/2000 |
| DE | 10047787 | 3/2002 |
| EP | 0045256 | 2/1982 |
| EP | 0153235 | 8/1985 |
| EP | 0330872 | 2/1989 |
| EP | 0412587 | 2/1991 |
| EP | 0625869 | 11/1994 |
| EP | 0675324 A1 | 10/1995 |
| EP | 0837041 | 4/1998 |
| EP | 1004746 | 5/2000 |
| EP | 1136542 | 9/2001 |
| EP | 1227141 | 7/2002 |
| EP | 1475429 | 11/2004 |
| EP | 1696177 A1 | 8/2006 |
| EP | 1865256 A1 | 12/2007 |
| FR | 2709980 | 3/1995 |
| GB | 191300500 | 0/1913 |
| GB | 683647 | 12/1952 |
| GB | 2422602 | 8/2006 |
| GB | 2451411 A | 1/2009 |
| JP | S48-63566 | 9/1973 |
| JP | 49052465 | 5/1974 |
| JP | 2122109 | 5/1990 |
| JP | 05066004 | 3/1993 |
| JP | 05071717 | 3/1993 |
| JP | 7-111247 B2 | 11/1995 |
| JP | 09033028 | 2/1997 |
| JP | 09101399 | 4/1997 |
| JP | 10002539 | 1/1998 |
| JP | 10132230 | 5/1998 |
| JP | 11515086 | 12/1999 |
| JP | 2000-282061 | 10/2000 |
| JP | 2001158887 | 6/2001 |
| JP | 2003-042429 A | 2/2003 |
| JP | 2003260454 | 9/2003 |
| KR | 10-2005-0004647 A | 1/2005 |
| KR | 1020050025290 A | 3/2005 |
| NL | 8200417 | 9/1983 |
| RU | 2125082 | 1/1999 |
| WO | 94/04631 | 3/1994 |
| WO | 01/81828 A1 | 11/2001 |
| WO | 02/096576 | 12/2002 |
| WO | 03/018467 | 3/2003 |
| WO | 03/018721 | 3/2003 |
| WO | 2004/041974 | 5/2004 |
| WO | 2004/072207 | 8/2004 |
| WO | 2004/072210 | 8/2004 |
| WO | 2004/087840 | 10/2004 |
| WO | 2005/047435 | 5/2005 |
| WO | 2005/118750 | 12/2005 |
| WO | 2006/081661 | 8/2006 |
| WO | 2006/114818 A1 | 11/2006 |
| WO | 2006/128285 A1 | 12/2006 |
| WO | 2006/128286 | 12/2006 |
| WO | 2007/131239 A2 | 11/2007 |
| WO | 2007/131241 A2 | 11/2007 |
| WO | 2009/009891 | 1/2009 |

OTHER PUBLICATIONS

Meeting of the Environmental Advisory Committee, *City of Ottawa Committee Meeting Minutes*, Doc. Minutes 27, (Ottawa: May 11, 2006), online: <http://www.ottawa.ca/_calendar/ottawa/citycouncil/a-eac/2006/05-11/minutes27.htm>.
Ontario, Ministry of the Environment, *Certificate of Approval—Air*, No. 6925-6REN9E (Dec. 1, 2006).
Ontario, Ministry of the Environment, *Provisional Certificate of Approval—Waste Disposal Site*, No. 3166-6TYMDZ (Dec. 1, 2006).
Plasco Energy Group, "Plasco Energy" (Apr. 2, 2006), online: Plasco Energy Group <http://web.archive.org/web/20060412190747/www.plascoenergygroup.com/>.
Presentation to the Hera Group, presented by Alisdair McLean of Plasco Energy Group, "Plasma Gasification of MSW" (Nov. 28, 2006), online: <http://www.conama8.org/modulodocumentos/documentos/SDs/SD32/SD32_ppt_AlisdairMclean.pdf>.
Presentation to the Ottawa Centre of Research and Innovation (OCRI), presented by Rod Bryden of the Plasco Energy Group, "A Leap Forward" (Oct. 26, 2006).
Dighe, "Westinghouse Plasma Coal Gasification & Vitrification Technology," Presentation to Electric Power Generation Association, Oct. 16-17, 2002, Hershey, PA, 18 pgs.
Kerr et al., "The Long Lake Project—The First Field Integration of SAGD and Upgrading," SPE International Thermal Operations and Heavy Oil Symposisum and International Horizontal Well Technology Conference, Nov. 4-7, 2002, Calagary, Alberta, Canada, 15 pgs.
Klein, "Gasification: An Alternative Process for Energy Recovery and Disposal of Municipal Solid Wastes," May 2002, 50 pages.
Physical Chemistry, $2^{nd}$ edition; Alberty et al., John Wiley & Sons, Inc., pp. 157-162, 1996.
Yang et al., "Converting moving-grate incineration from combustion to gasification—Numerical simulation of the burning characteristics," Waste Management, 27(5):645-655, 2007.
Translation of Notification of Reasons for Refusal issued Nov. 6, 2012 in Japanese Patent Application No. 2009-510138.

* cited by examiner

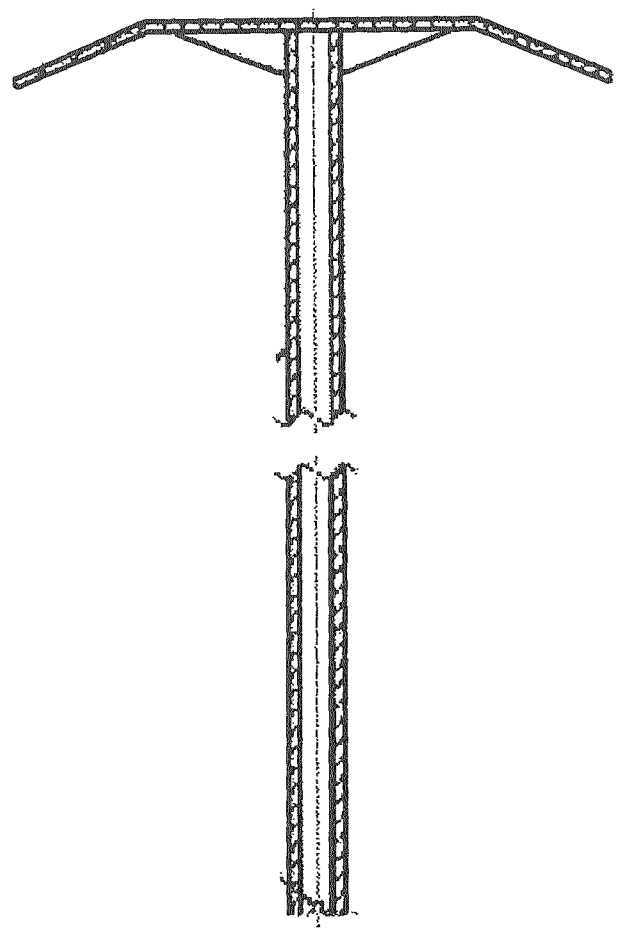
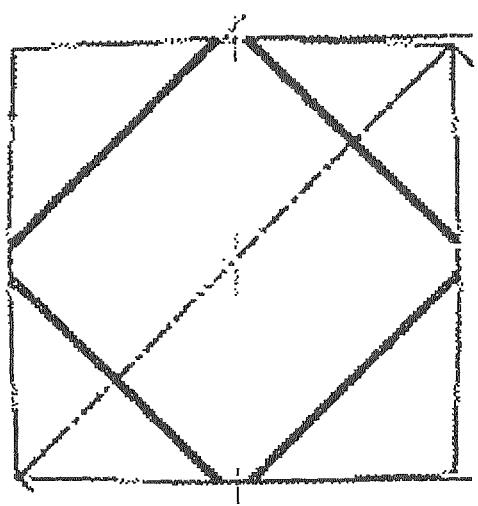
FIGURE 28

HORIZONTALLY-ORIENTED GASIFIER WITH LATERAL TRANSFER SYSTEM

CROSS REFERENCE TO RELATED APPLICATIONS

This application claims benefit of priority under 35 U.S.C. §119(e) from U.S. Provisional Application Ser. No. 60/798,439, filed May 5, 2006. This application also claims benefit of priority to International Patent Application No. PCT/CA2006/000881, filed Jun. 5, 2006. This application also claims benefit of priority under 35 U.S.C. §19(e) from U.S. Provisional Application Ser. No. 60/864,116, filed Nov. 2, 2006. This application also claims benefit of priority under 35 U.S.C. §119(e) from U.S. Provisional Application Ser. No. 60/911,179, filed Apr. 11, 2007. This application also claims benefit of priority under 35 U.S.C. §119(e) from U.S. Provisional Application Ser. No. 60/797,973, filed May 5, 2006. The contents of all of the aforementioned applications are hereby expressly incorporated by reference in their entirety and for all purposes.

FIELD OF THE INVENTION

This invention pertains to the field of carbonaceous feedstock gasification and in particular, to a horizontally-oriented gasifier with a lateral transfer system.

BACKGROUND OF THE INVENTION

Gasification is a process that enables the conversion of carbonaceous feedstock, such as municipal solid waste (MSW) or coal, into a combustible gas. The gas can be used to generate electricity, steam or as a basic raw material to produce chemicals and liquid fuels.

Possible uses for the gas include: the combustion in a boiler for the production of steam for internal processing and/or other external purposes, or for the generation of electricity through a steam turbine; the combustion directly in a gas turbine or a gas engine for the production of electricity; fuel cells; the production of methanol and other liquid fuels; as a further feedstock for the production of chemicals such as plastics and fertilizers; the extraction of both hydrogen and carbon monoxide as discrete industrial fuel gases; and other industrial applications.

Generally, the gasification process consists of feeding carbonaceous feedstock into a heated chamber (the gasifier) along with a controlled and/or limited amount of oxygen and optionally steam. In contrast to incineration or combustion, which operate with excess oxygen to produce $CO_2$, $H_2O$, $SO_x$, and NOx, gasification processes produce a raw gas composition comprising CO, $H_2$, $H_2S$, and $NH_3$. After cleanup, the primary gasification products of interest are $H_2$ and CO.

Useful feedstock can include any municipal waste, waste produced by industrial activity and biomedical waste, sewage, sludge, coal, heavy oils, petroleum coke, heavy refinery residuals, refinery wastes, hydrocarbon contaminated soils, biomass, and agricultural wastes, tires, and other hazardous waste. Depending on the origin of the feedstock, the volatiles may include $H_2O$, $H_2$, $N_2$, $O_2$, $CO_2$, CO, $CH_4$, $H_2S$, $NH_3$, $C_2H_6$, unsaturated hydrocarbons such as acetylenes, olefins, aromatics, tars, hydrocarbon liquids (oils) and char (carbon black and ash).

As the feedstock is heated, water is the first constituent to evolve. As the temperature of the dry feedstock increases, pyrolysis takes place. During pyrolysis the feedstock is thermally decomposed to release tars, phenols, and light volatile hydrocarbon gases while the feedstock is converted to char.

Char comprises the residual solids consisting of organic and inorganic materials. After pyrolysis, the char has a higher concentration of carbon than the dry feedstock and may serve as a source of activated carbon. In gasifiers operating at a high temperature (>1,200° C.) or in systems with a high temperature zone, inorganic mineral matter is fused or vitrified to form a molten glass-like substance called slag.

Since the slag is in a fused, vitrified state, it is usually found to be non-hazardous and may be disposed of in a landfill as a non-hazardous material, or sold as an ore, road-bed, or other construction material. It is becoming less desirable to dispose of waste material by incineration because of the extreme waste of fuel in the heating process and the further waste of disposing, as a residual waste, material that can be converted into a useful syngas and solid material.

The means of accomplishing a gasification process vary in many ways, but rely on four key engineering factors: the atmosphere (level of oxygen or air or steam content) in the gasifier; the design of the gasifier; the internal and external heating means; and the operating temperature for the process. Factors that affect the quality of the product gas include: feedstock composition, preparation and particle size; gasifier heating rate; residence time; the plant configuration including whether it employs a dry or slurry feed system, the feedstock-reactant flow geometry, the design of the dry ash or slag mineral removal system; whether it uses a direct or indirect heat generation and transfer method; and the syngas cleanup system. Gasification is usually carried out at a temperature in the range of about 650° C. to 1200° C., either under vacuum, at atmospheric pressure or at pressures up to about 100 atmospheres.

There are a number of systems that have been proposed for capturing heat produced by the gasification process and utilizing such heat to generate electricity, generally known as combined cycle systems.

The energy in the product gas coupled with substantial amounts of recoverable sensible heat produced by the process and throughout the gasification system can generally produce sufficient electricity to drive the process, thereby alleviating the expense of local electricity consumption. The amount of electrical power that is required to gasify a ton of a carbonaceous feedstock depends directly upon the chemical composition of the feedstock.

If the gas generated in the gasification process comprises a wide variety of volatiles, such as the kind of gas that tends to be generated in a low temperature gasifier with a "low quality" carbonaceous feedstock, it is generally referred to as off-gas. If the characteristics of the feedstock and the conditions in the gasifier generate a gas in which CO and $H_2$ are the predominant chemical species, the gas is referred to as syngas. Some gasification facilities employ technologies to convert the raw off-gas or the raw syngas to a more refined gas composition prior to cooling and cleaning through a gas quality conditioning system.

Utilizing plasma heating technology to gasify a material is a technology that has been used commercially for many years. Plasma is a high temperature luminous gas that is at least partially ionized, and is made up of gas atoms, gas ions, and electrons. Plasma can be produced with any gas in this manner. This gives excellent control over chemical reactions in the plasma as the gas might be neutral (for example, argon, helium, neon), reductive (for example, hydrogen, methane, ammonia, carbon monoxide), or oxidative (for example, oxygen, carbon dioxide). In the bulk phase, a plasma is electrically neutral.

Some gasification systems employ plasma heat to drive the gasification process at a high temperature and/or to refine the offgas/syngas by converting, reconstituting, or reforming longer chain volatiles and tars into smaller molecules with or without the addition of other inputs or reactants when gaseous molecules come into contact with the plasma heat, they will disassociate into their constituent atoms. Many of these atoms will react with other input molecules to form new molecules, while others may recombine with like atoms. As the temperature of the molecules in contact with the plasma heat decreases all atoms fully recombine. As input gases can be controlled stoichiometrically, output gases can be controlled to, for example, produce substantial levels of carbon monoxide and insubstantial levels of carbon dioxide.

The very high temperatures (3000 to 7000° C.) achievable with plasma heating enable a high temperature gasification process where virtually any input feedstock including waste in as-received condition, including liquids, gases, and solids in any form or combination can be accommodated. The plasma technology can be positioned within a primary gasification chamber to make all the reactions happen simultaneously (high temperature gasification), can be positioned within the system to make them happen sequentially (low temperature gasification with high temperature refinement), or some combination thereof.

The gas produced during the gasification of carbonaceous feedstock is usually very hot but may contain small amounts of unwanted compounds and requires further treatment to convert it into a useable product. Once a carbonaceous material is converted to a gaseous state, undesirable substances such as metals, sulfur compounds and ash may be removed from the gas. For example, dry filtration systems and wet scrubbers are often used to remove particulate matter and acid gases from the gas produced during gasification. A number of gasification systems have been developed which include systems to treat the gas produced during the gasification process.

These factors have been taken into account in the design of various different systems which are described, for example, in U.S. Pat. Nos. 6,686,556, 6,630,113, 6,380,507; 6,215,678, 5,666,891, 5,798,497, 5,756,957, and U.S. patent application Nos. 2004/0251241, 2002/0144981. There are also a number of patents relating to different technologies for the gasification of coal for the production of synthesis gases for use in various applications, including U.S. Pat. Nos. 4,141,694; 4,181,504; 4,208,191; 4,410,336; 4,472,172; 4,606,799; 5,331,906; 5,486,269, and 6,200,430.

Prior systems and processes have not adequately addressed the problems that must be dealt with on a continuously changing basis. Some of these types of gasification systems describe means for adjusting the process of generating a useful gas from the gasification reaction. Accordingly, it would be a significant advancement in the art to provide a system that can efficiently gasify carbonaceous feedstock in a manner that maximizes the overall efficiency of the process, and/or the steps comprising the overall process.

SUMMARY OF THE INVENTION

An object of the present invention is to provide a horizontally-oriented gasifier with lateral transfer system. In accordance with an aspect of the invention, there is provided a horizontally-oriented gasifier comprising a horizontally-oriented gasification chamber having one or more feedstock inputs, one or more gas outlets and a solid residue outlets; a chamber heating system; one or more lateral transfer units for moving material through the gasifier during processing; and a control system for controlling movement of the one or more lateral transfer units.

In accordance with another aspect of the invention, there is provided a process for converting a feedstock to an off-gas and ash, comprising the steps of:
a) establishing three regional temperature zones in an horizontally-oriented gasifier; wherein a first zone has a temperature which promotes drying, a second zone has a temperature which promotes volatization and a third zone has a temperature which promotes char-to-ash conversion;
b) providing carbonaceous feedstock to the first zone and maintaining the carbonaceous feedstock at the first zone for a period of time to obtain a substantially dried reactant material;
c) passing the substantially dried reactant material to the second zone for a period of time such that volatile components of the dried reactant material are volatilized to form off-gas;
d) passing residual char from the second zone to the third zone for period of time such that the char is converted to additionally off-gas and ash.

This invention provides a horizontally-oriented gasifier with lateral transfer system that enables extraction of volatiles throughout the various stages of gasification of carbonaceous feedstock to be optimized. Feedstock is introduced at one end of the gasifier and is moved through the gasifier during processing by one or more lateral transfer units. The temperature at the top of the material pile generally increases as gasification proceeds through drying, volatilization and char-to-ash conversion (carbon conversion) with the simultaneous production of CO and $CO_2$. A control system obtains information from measurable parameters such as temperature and pile height or profile and manages the movement of each lateral transfer unit independently.

BRIEF DESCRIPTION OF THE DRAWINGS

Embodiments of the invention will now be described, by way of example only, by reference to the attached Figures, wherein:

FIG. 28 is an illustration of the thermocouple for an embodiment of the invention, detailing the deflector.

DETAILED DESCRIPTION OF THE INVENTION

Definitions

Figure 1:
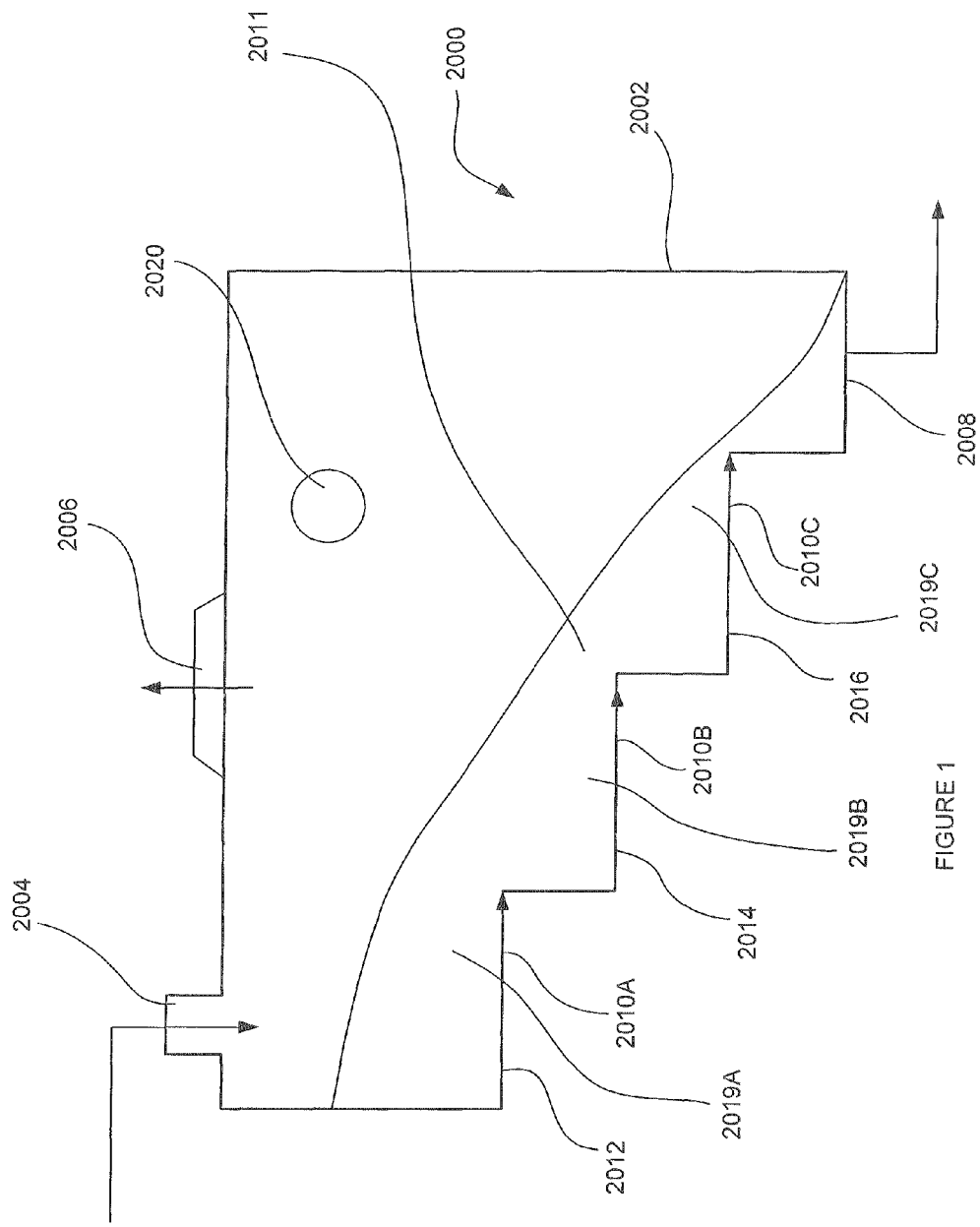
FIG. 1 is a schematic of a horizontally-oriented stepped floor gasifier of the invention, detailing the feedstock input, gas outlet, ash outlet and lateral transfer system.

As used herein, the term "sensing element" is defined to describe any element of the system configured to sense a characteristic of a process, a process device, a process input or process output, wherein such characteristic may be represented by a characteristic value useable in monitoring, regulating and/or controlling one or more local, regional and/or global processes of the system. Sensing elements considered within the context of a gasification system may include, but are not limited to, sensors, detectors, monitors, analyzers or any combination thereof for the sensing of process, fluid and/or material temperature, pressure, flow, composition and/or other such characteristics, as well as material position and/or disposition at any given point within the system and any operating characteristic of any process device used within the system. It will be appreciated by the person of ordinary skill in the art that the above examples of sensing elements, though each relevant within the context of a gasification system, may not be specifically relevant within the context of the present disclosure, and as such, elements identified herein as sensing elements should not be limited and/or inappropriately construed in light of these examples.

As used herein, the term "response element" is defined to describe any element of the system configured to respond to a sensed characteristic in order to operate a process device operatively associated therewith in accordance with one or more pre-determined, computed, fixed and/or adjustable control parameters, wherein the one or more control parameters are defined to provide a desired process result. Response elements considered within the context of a gasification system may include, but are not limited to static, pre-set and/or dynamically variable drivers, power sources, and any other element configurable to impart an action, which may be mechanical, electrical, magnetic, pneumatic, hydraulic or a combination thereof, to a device based on one or more control parameters. Process devices considered within the context of a gasification system, and to which one or more response elements may be operatively coupled, may include, but are not limited to, material and/or feedstrock input means, heat sources such as plasma heat sources, additive input means, various gas blowers and/or other such gas circulation devices, various gas flow and/or pressure regulators, and other process devices operable to affect any local, regional and/or global process within a gasification system. It will be appreciated by the person of ordinary skill in the art that the above examples of response elements, though each relevant within the context of a gasification system, may not be specifically relevant within the context of the present disclosure, and as such, elements identified herein as response elements should not be limited and/or inappropriately construed in light of these examples.

As used herein, the term, "reactant material" can mean feedstock, including but not limited to partially or fully processed feedstock.

As used herein, the term "(carbonaceous) feedstock" can be any carbonaceous material appropriate for gasifying in the present gasification process, and can include, but ia not limited to, any waste materials, coal (including low grade, high sulfur coal not suitable for use in coal-fired power generators), petroleum coke, heavy oils, biomass, sewage sludge, sludge from pulp and paper mills and agricultural wastes. Waste materials suitable for gasification include both hazardous and non-hazardous wastes, such as municipal waste, wastes produced by industrial activity (paint sludges, off-spec paint products, spent sorbents), automobile fluff, used tires and biomedical wastes, any carbonaceous material inappropriate for recycling, including non-recyclable plastics, sewage sludge, coal, heavy oils, petroleum coke, heavy refinery residuals, refinery wastes, hydrocarbon contaminated solid waste and biomass, agricultural wastes, tires, hazardous waste, industrial waste and biomass. Examples of biomass useful for gasification include, but are not limited to, waste or fresh wood, remains from fruit, vegetable and grain processing, paper mill residues, straw, grass, and manure.

As used herein, the term, "input" denotes that which is about to enter or be communicated to any system or component thereof, is currently entering or being communicated to any system or component thereof, or has previously entered or been communicated to any system or component thereof. An input includes, but is not limited to, compositions of matter, information, data, and signals, or any combination thereof. In respect of a composition of matter, an input may include, but is not limited to, influent(s), reactant(s), reagent(s), fuel(s), object(s) or any combinations thereof. In respect of information, an input may include, but is not limited to, specifications and operating parameters of a system. In respect of data, an input may include, but is not limited to, result(s), measurement(s), observation(s), description(s), statistic(s), or any combination thereof generated or collected from a system. In respect of a signal, an input may include, but is not limited to, pneumatic, electrical, audio, light (visual and non-visual), mechanical or any combination thereof. An input may be defined in terms of the system, or component thereof, to which it is about to enter or be communicated to, is currently entering or being communicated to, or has previously entered or been communicated to, such that an input for a given system or component of a system may also be an Output in respect of another system or component of a system. Input can also denote the action or process of entering or communicating with a system.

As used herein, the term "output" denotes that which is about to exit or be communicated from any system or component thereof, is currently exiting or being communicated from any system or component thereof, or has previously exited or been communicated from any system or component thereof. An output includes, but is not limited to, compositions of matter, information, data, and signals, or any combination thereof. In respect of a composition of matter, an output may include, but is not limited to, effluent(s), reaction product(s), process waste(s), fuel(s), object(s) or any combinations thereof. In respect of information, an output may include, but is not limited to, specifications and operating parameters of a system. In respect of data, an output may include, but is not limited to, result(s), measurement(s), observation(s), description(s), statistic(s), or any combination thereof generated or collected from a system. In respect of a signal, an output may include, but is not limited to, pneumatic, electrical, audio, light (visual and non-visual), mechanical or any combination thereof. An output may be defined in terms of the system, or component thereof, to which it is about to exit or be communicated from, currently exiting or being communicated from, or has previously exited or been communicated from, such that an output for a given system or component of a system may also be an input in respect of another system or component of a system. Output can also denote the action or process of exiting or communicating with a system.

Overview of the System

Referring to FIG. 1, this invention provides a horizontally-oriented gasifier (2000) having one or more feedstock input(s) (2004), one or more gas outlet(s) (2006) and a solid residue (ash) outlet (2008). Material enters the gasifier (2000) via the one or more feedstock input(s) (2004) and is moved through the gasifier (2000) during processing by one or more lateral transfer units (2010) which is controlled by a control system.

The invention provides a horizontally-oriented gasifier (2000) comprising a lateral transfer system to facilitate the extraction of gaseous molecules from carbonaceous feedstock. In particular, the invention provides a gasifier in which the gasification process is facilitated by sequentially promoting drying, volatilization and char-to-ash conversion (carbon conversion). This is accomplished by allowing drying to occur at a certain temperature range prior to moving the material to another region and allowing volatilization to occur at another temperature range, prior to moving the material to another region and allowing char-to-ash conversion to occur at another temperature range. Accordingly, as the material in the gasifier is moved from the feed area towards the solid residue end by one or more lateral transfer units (2010) it goes through different degrees of drying, volatization and char-to-ash conversion (carbon conversion).

To facilitate movement of reactant material, the individual lateral transfer units (2010) can be controlled independently or a group of two or more lateral transfer units (2010) can be controlled in a coordinated manner.

Thus, each area in the horizontally-oriented gasifier experiences temperature ranges and optional process additives (2019) (such as air, oxygen and/or steam) that promote a certain stage of the gasification process. In a pile of reactant material, all stages of gasification are occurring concurrently, however individual stages are favored at a certain temperature range.

By physically moving the material through the gasifier, the gasification process can be facilitated by allowing as much drying as energetically efficient to occur prior to raising the temperature of the material to promote volatilization. The process then seeks to allow as much volatilization as energetically efficient to occur prior to raising the temperature of the material to promote char-to-ash conversion (carbon conversion).

Figure 2:
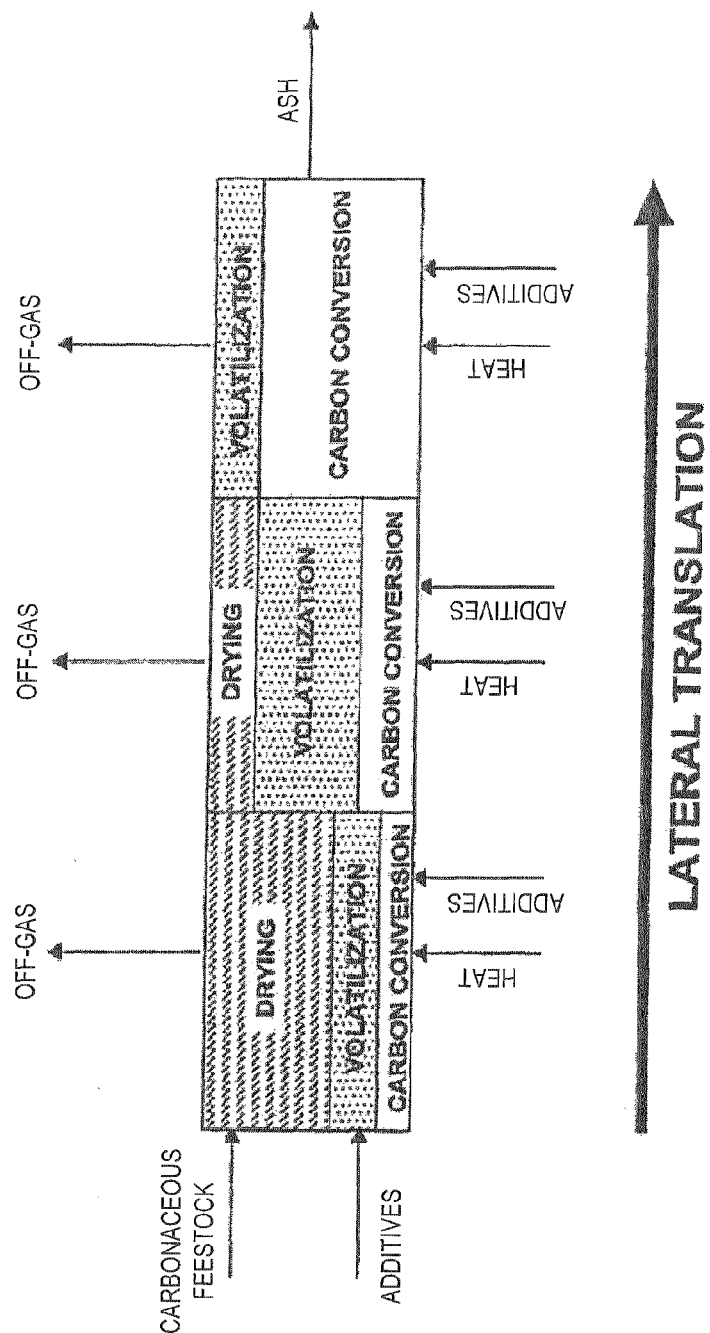
FIG. 2 is a flow diagram showing the different regions of the gasifier in general terms.
Figure 3:
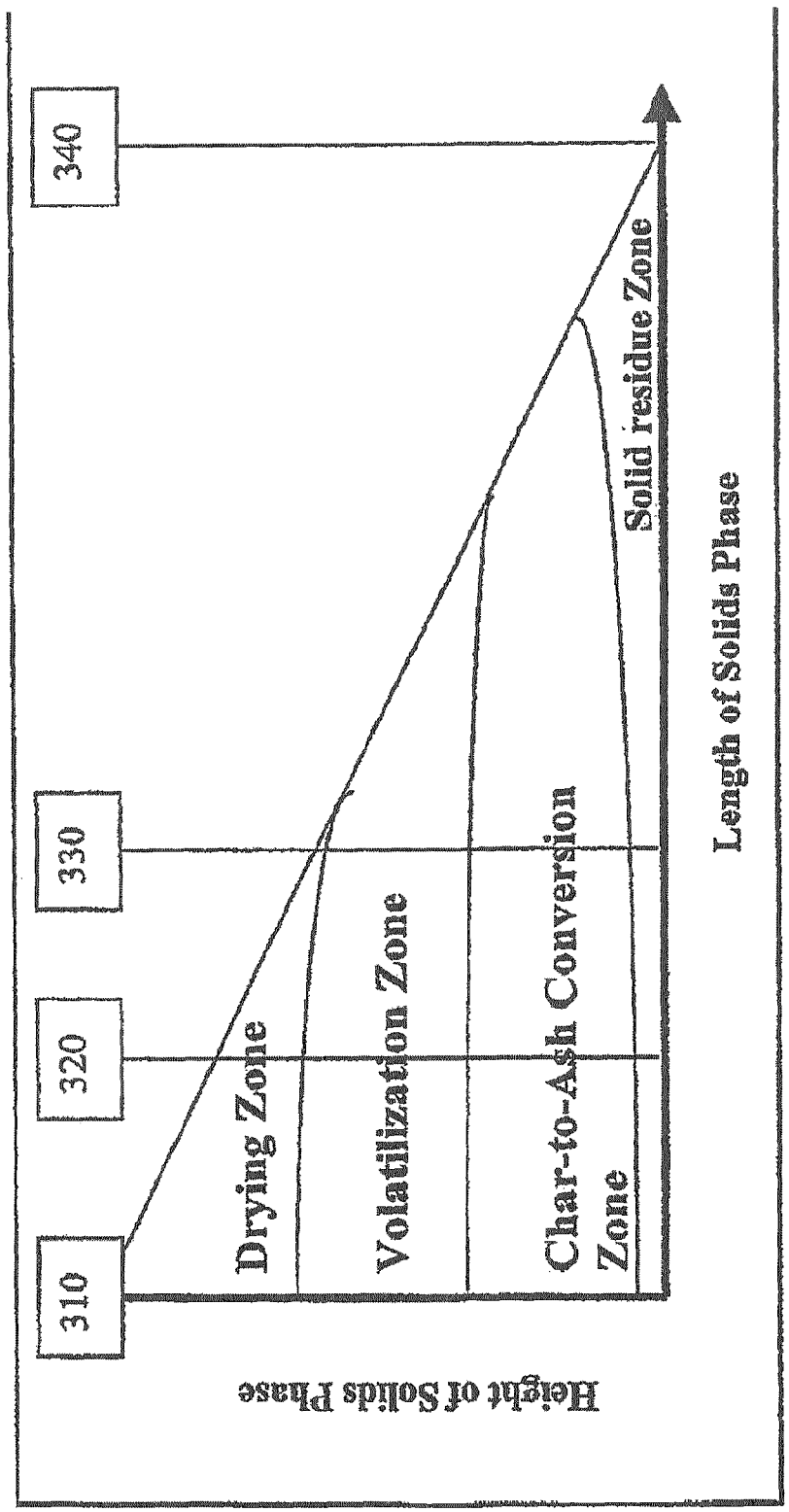
FIG. 3 is a representation of the gasification processes occurring in Regions 1, 2 and 3 of one embodiment of the gasifier.
Figure 4:
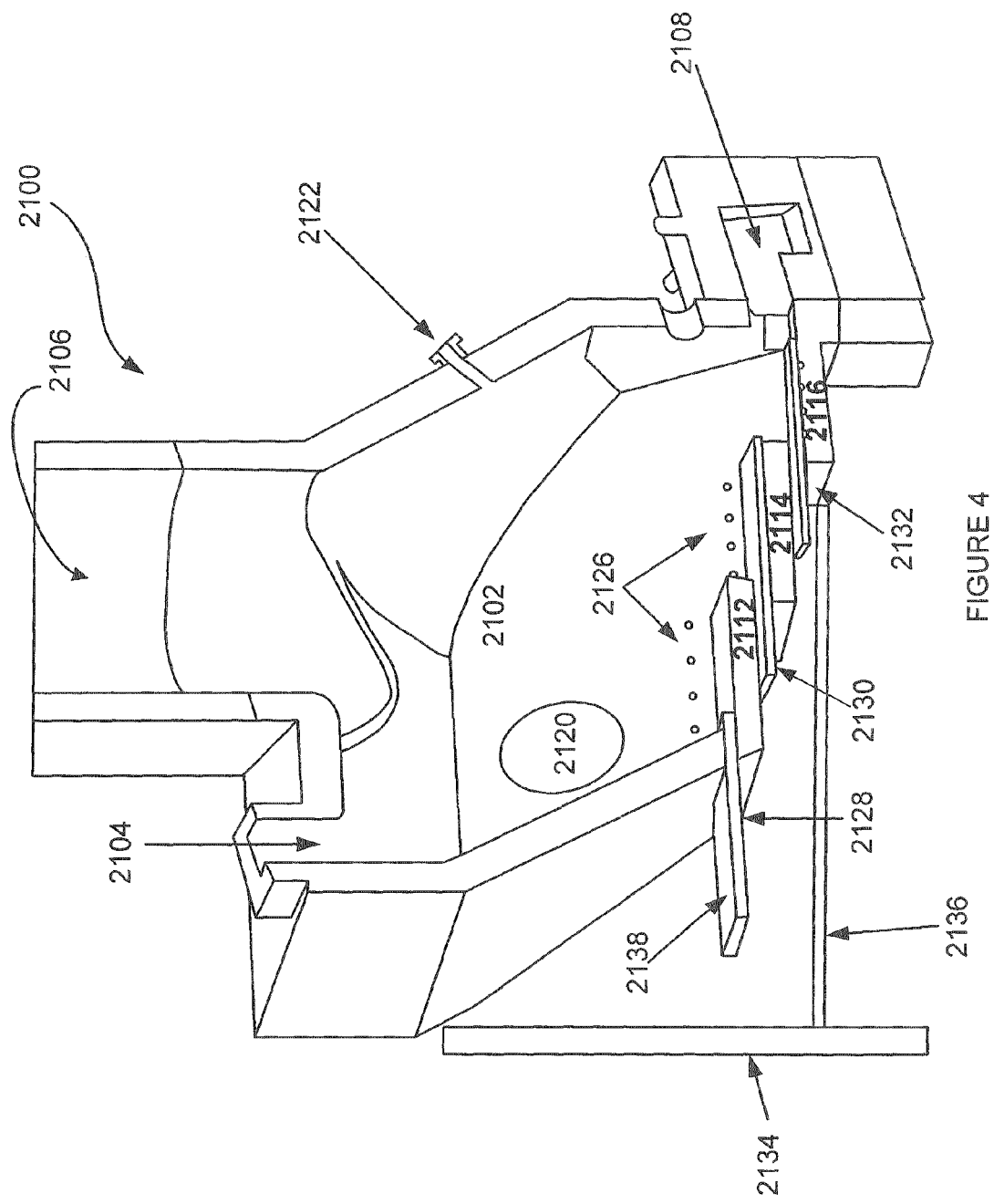
FIG. 4 is a cross-sectional view through one embodiment of the gasifier, detailing the feedstock input, gas outlet, ash outlet, lateral transfer system, additive ports and access ports.
Figure 5:
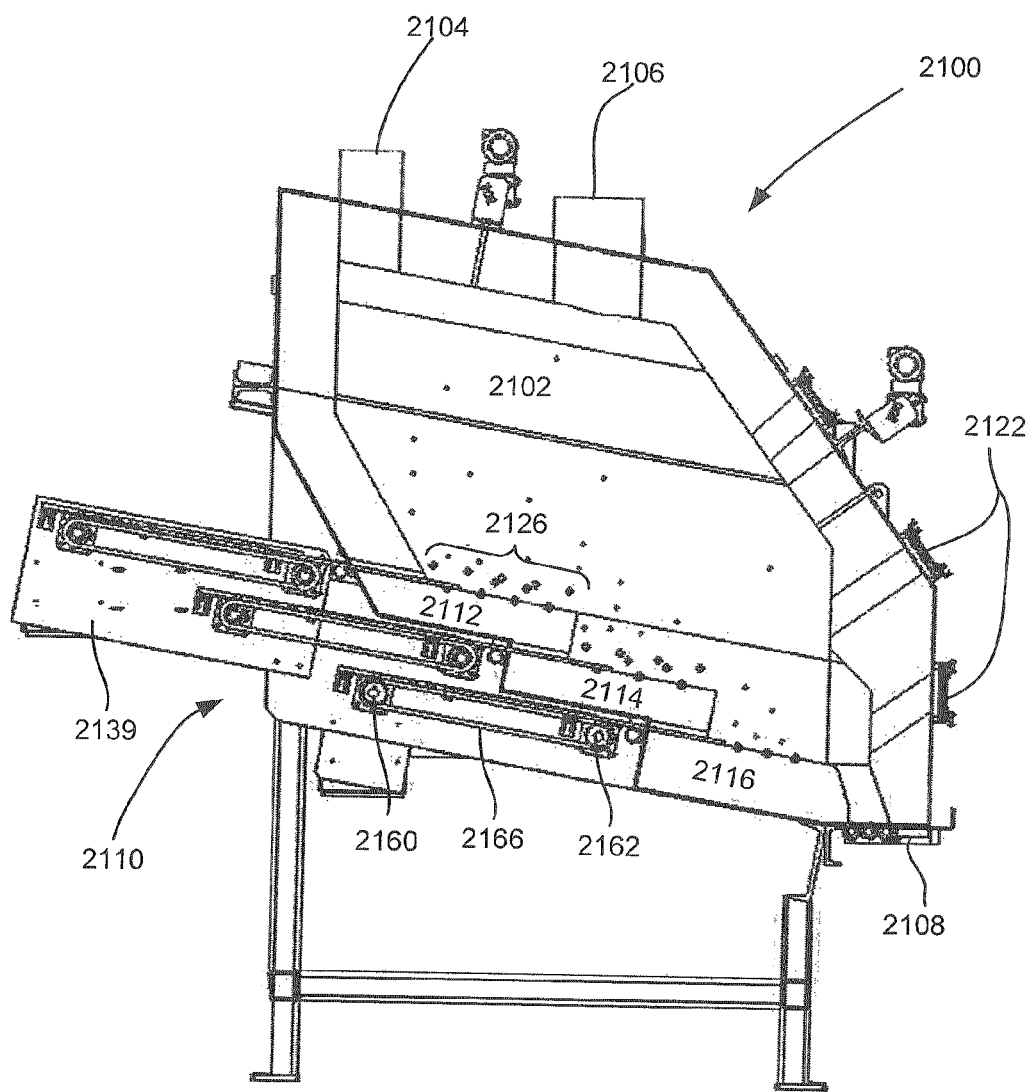
FIG. 5 is a central longitudinal cross-sectional view through the embodiment of the gasifier illustrated in FIG. 4, detailing the thermocouples and process additive ports.
Figure 6:
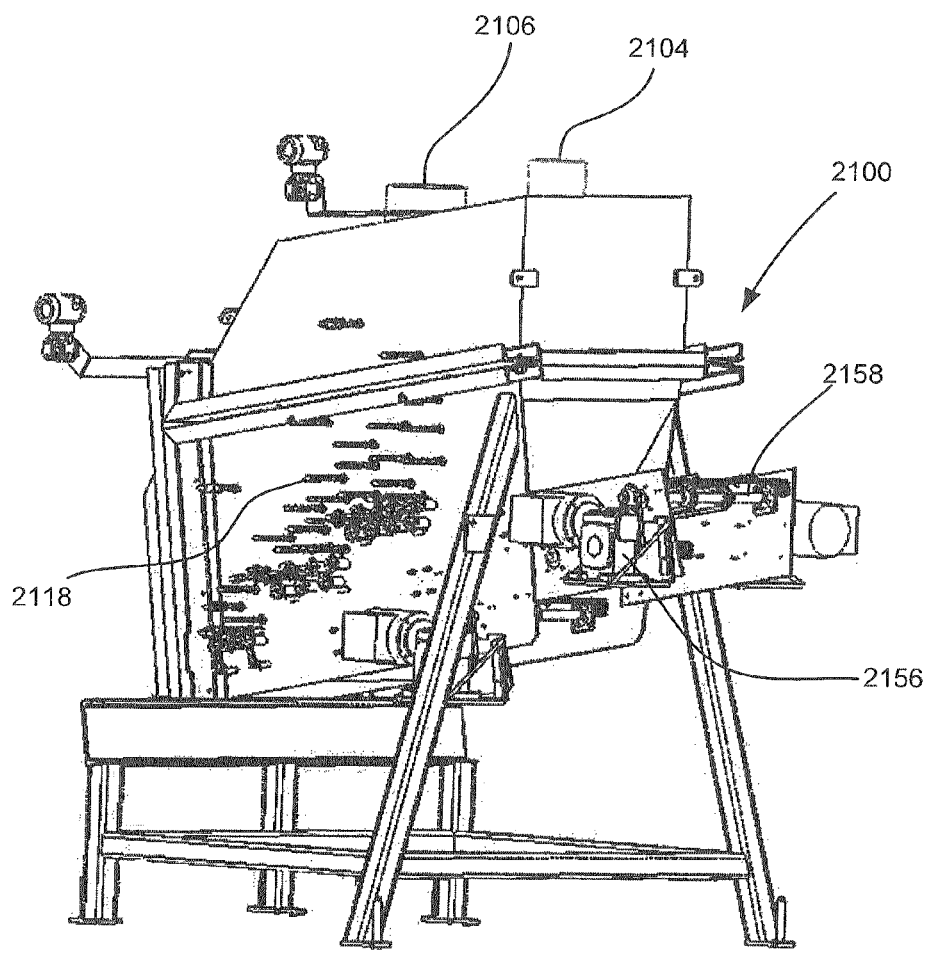
FIG. 6 is a perspective view of the embodiment of the gasifier illustrated in FIGS. 4 and 5.
Figure 7:
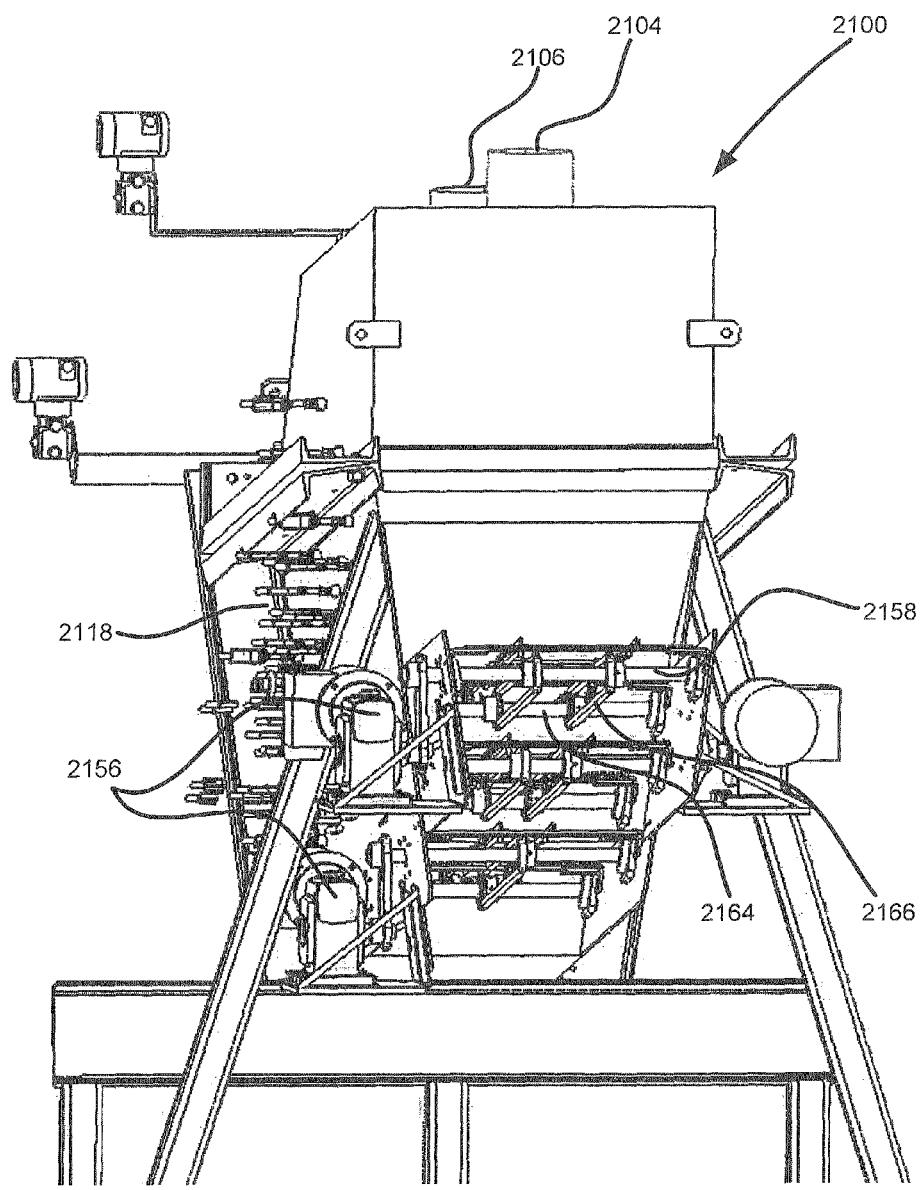
FIG. 7 illustrates a view of the outside of the embodiment of the gasifier illustrated in FIGS. 4 to 6 detailing the external elements of the lateral transfer system.

As illustrated in FIGS. 2 and 3, the horizontal expansion of the gasification process achieved by use of the invention facilitates the gasification process by regionally promoting one or more of the stages (drying, volatization and char-to-ash conversion) of the gasification process in response to the characteristics of the reactant material at that particular location in the gasifier.

Theoretically, the conditions in the gasifier at any location could be optimized in response to the character of the reactant material at that particular location. A practical embodiment of this concept, however, is to segregate the gasifier into a finite number of regions optimized in response to the general or average reactant material characteristics of a larger area. For example, the gasifier could therefore be segregated into two, three, four or more regions depending on the characteristics of the feedstock. To facilitate understanding, the discussion below describes segregating the gasifier into three regions. The invention, however, is not limited to a gasifier having three regions.

Although as discussed above the processes of gasification are occurring in a continuous and concurrent manner throughout the gasifier, the gasifier can be notionally divided into regions. In the three region embodiment:

Region I: Promotes Drying of the Material

Referring to FIG. 2, Region I would be the area between lines 310 and 320. Feedstock is delivered into the gasifier at Region I. The normal temperature range for this region (as measured at the bottom of the material pile) lies between about 300 and 900° C. The major process here is that of drying which occurs predominantly at the top and in middle of the pile of material and at a temperature above about 100° C. In addition, some volatilization and some char-to-ash conversion (carbon conversion) occurs in this region.

Region II: Promotes Volatilization of the Material

Referring to FIG. 3, Region II would be the region between lines 320 and 330. The material pile has a bottom temperature range between about 400 and 950° C. The main process occurring in Region II is that of volatilization with the remainder of the drying operation as well as a substantial amount of char to ash conversion (carbon conversion).

Region III: Char-to-Ash Conversion (Carbon Conversion)

Referring to FIG. 3, Region III would be the region between lines 330 and 340. The Region III temperature range lies between about 500 and 1000° C. Although, in one embodiment in order to avoid agglomeration of the ash, the maximum temperature in this region does not exceed about 950° C. The major process in Region III is that of carbon conversion with a lesser amount (the remainder) of volatilization. By this time the moisture from the reactant material has been removed. By the end of this region, the majority of the solid residue is ash.

In one embodiment, the ash from Region III is translocated into an ash collection chamber. Appropriate ash collection chambers are known in the art and accordingly, a worker skilled in the art having regard to the requirements of the system would readily know the size, shape and manufacture of an appropriate ash collection chamber.

In one embodiment, the ash will be translocated into a water tank for cooling, from which the gasifier residue is transmitted through a conduit, optionally, under control of a valve, to a point of discharge.

In one embodiment, the ash is translocated into a solid residue conditioning conversion chamber for the conversion of ash-to-slag.

Horizontally-Oriented Gasifier

Referring now to FIG. 1, the gasifier (2000) comprises a horizontally-oriented gasification chamber (2002) having a feedstock input (2004), gas outlet (2006) and ash (solid residue) outlet (2008). The gasifier further comprises a lateral transfer system having one or more lateral transfer units (2010) for transporting solid material through the gasification chamber.

In one embodiment, the number of lateral transfer units in a particular gasifier is dependent on the path length reactant material must travel and the distance reactant material can be moved by each lateral transfer unit and is a compromise between minimizing the magnitude of process disturbances caused by each discrete transfer and mechanical complexity, cost, and reliability.

During processing, feedstock is introduced into the chamber (2002) at one end; hereafter referred to as the feed end, through the feedstock input (2004) and is transported from the feed end through the various regions in the gasification chamber towards the ash (solid residue) outlet (2008) or ash end. As the feed material progresses through the chamber, it loses its mass and volume as its volatile fraction is volatilized to form off-gas and the resulting char is reacted to form additional off-gas and ash.

Due to this progressive conversion, the height of the material (pile height) decreases from the feed end to the ash end of the chamber and levels off when only solid residue (ash) remains.

In one embodiment, the off-gas escapes through the gas outlet (2006) into, for example, a gas refinement chamber where it can undergo further processing including plasma heat-dependent processing or into a storage chamber or tank. The solid residue (ash) is transported through the ash outlet (2008) to, for example, an ash collection chamber or a solid residue conditioning chamber for further processing.

In one embodiment, the gasifier has a stepped floor having a plurality of floor levels or steps. Optionally, each floor level is sloped. In one embodiment the floor level is sloped between about 5 and about 10 degrees.

In one embodiment of the step-floor gasifier, the individual steps (floor levels) correlate, at least in part, with the individual regions discussed above, with each region or step having conditions optimized for different degrees of drying, volatilization and carbon conversion. For convenience, the uppermost step will be referred to as step A; the next step will be referred to as step B, etc. Corresponding lateral transfer units will be identified with the same letter, i.e. lateral transfer unit A or ram A services step A, lateral transfer unit B or ram B services step B.

In the three step embodiment, there is an upper step or step A (2012), middle step or step B (2014) and a lower step or step C (2016).

The feedstock is fed onto the upper step (step A) (2012). The normal temperature range for this step (as measured at the bottom of the material pile) lies between 300 and 900° C.

Step B is designed to have a bottom temperature range between 400 and 950° C. to promote volatilization with the remainder of the drying operation as well as a substantial amount of char-to-ash conversion (carbon conversion).

Step C temperature range lies between 500 and 1000° C. The major process in Step C is that of char-to-ash conversion (carbon conversion) with a lesser amount (the remainder) of volatilization.

In one embodiment, movement over the steps is facilitated by the lateral transfer system with each step optionally being serviced by an independently controlled lateral transfer unit.

Design Considerations for the Chamber

The chamber of a gasifier is designed to provide a sealed, insulated space for processing of the feedstock into off-gas and to allow for passage of off-gas to downstream process such as cooling or refining or other and optionally for removal of ash for subsequent further processing. Such processing of the feedstock is facilitated by a design that promotes the introduction of process additives, such as hot air and/or steam, into the reactant material throughout the gasifier and enables control of the pile height of the reactant material and its movement through the gasifier without disruption or bridging. The design may optionally provide for access to the interior of the gasifier for inspection, maintenance and repair.

A gasifier is designed to accomplish extraction of volatile compounds from the carbonaceous feedstock. Thus, factors such as heat transfer, gas flow, mixing of process additives, among others, can be taken into account when designing the shape of the gasifier. The use of computer modeling can facilitate the optimization of gasifier design. Appropriate computer modeling systems and simulators are known in the art and include the Chemical Process Simulator as detailed in U.S. Pat. No. 6,817,388 (incorporated by reference).

In one embodiment, in addition to using the Chemical Process Simulator, flow modeling of the gasifier can be performed to ensure proper mixing of process inputs, and to ensure that kinetic effects are not significant.

The physical design characteristics of the gasifier are determined by a number of factors. These factors include, for example, the chemical composition and physical characteristics of the feedstock to be processed including moisture content, particle size, hardness and flow characteristics; system throughput; required conversion efficiency (residence time); desired gasifier geometry (1/d ratio); material transport characteristics; mixing characteristics (solid and gas); gas superficial velocity and additive distribution among others. The internal configuration and size of the gasification chamber are dictated, in part, by the operational characteristics through analyses of the input waste stream to be processed.

As discussed above, the feedstock is introduced into the gasifier via the feedstock input (2004) and moves through the gasification chamber during processing. This movement is achieved, wholly or in part, by the use of a lateral transfer system.

In one embodiment, to facilitate reactant material transfer, when designing the gasifier the dynamics of reactant material transfer through the gasifier can be considered such that the risk of bridging, obstruction of reactant material flow by various instrumentations or by resistance from downstream reactant material or by wall friction can be reduced or eliminated.

During processing, air as a source of oxygen is introduced into the chamber. Optionally, the method of injecting air can be selected to facilitate an even flow of air into the gasification chamber, prevent hot spot formation and/or improve temperature control. The air can be introduced through the sides of the chamber, optionally from near the bottom of the chamber, or can be introduced through the floor of the chamber, or through both.

Also to be considered in the design of the gasifier is the position, orientation and number of the process additive inputs. The process additives can optionally be injected into the gasifier at locations where they will ensure most efficient reaction to achieve the desired conversion result.

In one embodiment, the floor of the gasification chamber is perforated to varying degrees to allow for introduction of process additives, such as air at the base of the material pile.

In one embodiment, the side-walls of the chamber slope inwards towards the bottom to achieve a small enough width for good air penetration from the sides while still having the required volume of material. The slope angle can optionally be made steep enough to assure that the material will drop towards the bottom of the chamber during processing.

In one embodiment, the gasification chamber is a steel weldment with connection features for feedstock input, air and steam input, gas output and ash removal.

In one embodiment, the gasification chamber is tubular.

In one embodiment, the roof or upper portion of the gasification chamber is designed to optimize flow and residence time of gas throughout the gasification chamber. The roof portion can be flat, domed, half-cylindrical or another practical configuration that promotes the flow of gas through the gasification chamber.

In one embodiment, the gasification chamber of the invention is a horizontal vessel with its cross-section optionally including a semi-circular dome or arched roof and optionally with a tapered lower section.

Materials

The gasification chamber is a partially or fully refractory-lined chamber with an internal volume sized to accommodate the appropriate amount of material for the required solids residence time. The refractory protects the gasification chamber from the high temperature and corrosive gases and minimizes unnecessary loss of heat from the process. The refractory material can be a conventional refractory material well-known to those skilled in the art and which is suitable for use for a high temperature e.g. up to about 1100° C., un-pressurized reaction. When choosing a refractory system factors to be considered include internal temperature, abrasion; erosion and corrosion; desired heat conservation/limitation of temperature of the external vessel; desired life of the refractory. Examples of appropriate refractory material include high temperature fired ceramics, i.e., aluminum oxide, aluminum nitride, aluminum silicate boron nitride, zirconium phosphate, glass ceramics and high alumina brick containing principally, silica, alumina, chromia and titania. To further protect the gasification chamber from corrosive gases the chamber is, optionally, partially or fully lined with a protective membrane. Such membranes are known in the art and, as such, a worker skilled in the art would readily be able to identify appropriate membranes based on the requirements of the system and, for example, include Sauereisen High Temperature Membrane No 49.

In one embodiment, the refractory is a multilayer design with a high density layer on the inside to resist the high temperature, abrasion, erosion and corrosion. Outside the high density material is a lower density material with lower resistance properties but higher insulation factor. Optionally, outside this layer is a very low density foam board material with very high insulation factor and can be used because it will not be exposed to abrasion of erosion. Appropriate materials for use in a multilayer refractory are well known in the art.

In one embodiment, the multilayer refractory comprises an internally oriented chromia layer; a middle alumina layer and an outer insboard layer.

The wall of the chamber can optionally incorporate supports for the refractory lining or refractory anchors. Appropriate refractory supports and anchors are known in the art.

Lateral Transfer System

Design Objectives

Material is moved through the gasification chamber in order to promote specific stages of the gasification process (drying, volatilization, char-to-ash conversion). To facilitate control of the gasification process, material movement through the gasification chamber can be varied (variable movement) depending on process requirements. This lateral movement of material through the gasifier is achieved via the use of a lateral transfer system comprising one or more lateral transfer units. Movement of reactant material by the lateral transfer system can be optimized by varying the movement speed, the distance a lateral transfer unit moves and the when multiple lateral transfer units are used, the sequence in which the plurality of lateral transfer units are moved in relation to each other. The one or more lateral transfer units can act in a coordinated manner or individual lateral transfer units can act independently. In order to facilitate control of the material flow rate and pile height the individual lateral transfer units can be moved individually, at varying speeds, at varying movement distances, at varying frequency of movement.

By strictly regulating the movement of the one or more lateral transfer units, the reactant pile can obtain the desired profile such that both wall friction and back pressure imposed by reactant material sitting on downstream stages is reduced or eliminated.

The lateral transfer system must be able to effectively operate in the harsh conditions of the gasifier and in particular must be able to operate at high temperatures. Moreover, the high temperature environment and abrasive nature of the feedstock demands that the lateral transfer system be robust.

In embodiments in which the hot air is supplied through the floor of the gasifier, the lateral transfer design can be a compromise between assurance of motion versus degradation of processing by blocking air-flow.

Lateral Transfer Units

The individual lateral transfer units comprise a moving element and a guiding element or alignment element. It would be apparent to a worker skilled in the art that the moving element can be equipped with appropriate guide engagement elements.

The moving element can include, but is not limited to, a shelf/platform, pusher ram or carrier rams, plow, screw element, conveyor or a belt. The rams can include a single ram or multiple-finger ram.

In one embodiment, the gasifier design will allow for the use of a single ram or multiple-finger ram.

In one embodiment, a multiple-finger ram is used when minimum interference with gas flows is desirable during operation of the rams.

In the multiple-finger ram designs, the multiple-finger ram may be a unitary structure or a structure in which the ram fingers are attached to a ram body, with individual ram fingers optionally being of different widths depending on location. The gap between the fingers in the multiple-finger ram design is selected to avoid particles of reactant material from bridging.

In one embodiment, the individual fingers are about 2 to about 3 inches wide, about 0.5 to about 1 inch thick with a gap between about 0.5 to about 2 inches wide.

In one embodiment, the moving element is "T-shaped".

In certain embodiments in which the system operates at very high temperatures, cooling can optionally be provided for the moving elements. In one embodiment using a ram or shelf, cooling within the ram or shelf can be provided. Such cooling could be by fluid (for example, air or water) circulated inside the ram or shelf from outside of the chamber.

In one embodiment, the plow has folding arms which can be withdrawn when the plow is retracted.

In one embodiment, the conveyor is a belt or flighted chain conveyor.

The moving element is constructed of material suitable for use at high temperature. Such materials are well-known to those skilled in the art and can include stainless steel, mild steel, or mild steel partially protected with or fully protected with refractory.

The guide elements can be located in the interior of the gasifier or be internally mounted. Alternatively, the guide elements can be located exterior to the gasifier or be externally mounted.

In embodiments in which the guide elements are interior or internal mounted, the lateral transfer system can be designed to prevent jamming or debris entrapment.

In embodiments in which the guide elements are located exterior to the gasifier or are externally mounted, the gasifier includes at least one sealable opening through which the moving element can enter the gasification chamber.

The guide element can include one or more guide channels located in the side walls of the gasifier, guide tracks or rails, guide trough or guide chains.

The guide engagement members can optionally include one or more wheels or rollers sized to movably engage the guide element. In one embodiment, the guide engagement member is a sliding member comprising a shoe adapted to slide along the length of the guide track. Optionally, the shoe further comprises at least one replaceable wear pad.

In one embodiment, the lateral location of the moving element is provided only at the point at which the moving element enters the gasification chamber, with alignment elements ensuring that the moving element is held angularly aligned at all times thereby eliminating the need for complex, accurate guide mechanisms.

In one embodiment, the alignment element is two chains driven synchronously by a common shaft. The chains are optionally individually adjustable to facilitate proper alignment.

In one embodiment, the lateral transfer system can be a movable shelf/platform in which material is predominantly moved through the gasifier by sitting on top of the shelf/platform. A fraction of material may also be pushed by the leading edge of the movable shelf/platform.

In one embodiment, the lateral transfer system can be a carrier ram in which material is predominantly moved through the gasifier by sitting on top of the carrier ram. A fraction of material may also be pushed by the leading edge of the carrier ram.

In one embodiment, the lateral transfer system can be a pusher ram in which material is predominantly pushed through the gasifier. Optionally, the ram height is substantially the same as the depth of the material to be moved.

In one embodiment, the lateral transfer system can be a set of conveyor screws. Optionally, the conveyor screws can be set in the floor of the chamber thereby allowing material to be moved without interfering with air introduction.

Power to propel the lateral transfer system is provided by a motor and drive system and is controlled by actuators.

The individual lateral transfer units may optionally by powered by dedicated motor and have individual actuators or one or more lateral transfer units may be powered by a single motor and shared actuators.

Basically any controllable motor or mechanical turning device that can provide accurate control of the lateral transfer system can be used to propel the lateral transfer system. Appropriate motors and devices are known in the art and include electric motors, motors run on syngas, steam, gases, gasoline, diesel or micro turbines.

In one embodiment, the motor is an electric variable speed motor which drives a motor output shaft selectably in the forward or reverse directions. Optionally, a slip clutch could be provided between the motor and the motor output shaft. The motor may further comprise a gear box.

Movement of the lateral transfer system can be effected by a hydraulic system, hydraulic rams, chain and sprocket drive, or a rack and pinion drive. These methods of translating the motor rotary motion into linear motion have the advantage that they can be applied in a synchronized manner at each side of a unit to assist in keeping the unit aligned and thus minimizing the possibility of the mechanism jamming.

In one embodiment, the use of two chains per ram keep the rams angularly aligned without the need for precision guides.

The externally mounted portions or components of the lateral transfer unit is optionally housed in an unsealed, partially sealed or sealed enclosure or casing. The enclosure may further comprise a removable cover to allow for maintenance. In one embodiment, the enclosure may have a higher internal pressure than the interior of the gasification chamber; this may be achieved by the use of nitrogen.

Chamber Heating System

The gasification process requires heat. Heat addition can occur directly by partial oxidation of the feedstock or indirectly by the use of one or more heat sources know in the art.

In one embodiment, the heat source can be circulating hot air. The hot air can be supplied from, for example, air boxes, air heaters or heat exchangers, all of which are known in the art.

In one embodiment, hot air is provided to each level by independent air feed and distribution systems. Appropriate air feed and distribution systems are known in the art and include separate air boxes for each step level from which hot air can pass through perforations in the floor of each step level to that step level or via independently controlled spargers for each step level.

In one embodiment, each floor level has one or more grooves running the length of individual steps. The grooves being sized to accommodate hot air and/or steam pipes. The pipes optionally being perforated on their lower third to half to facilitate the uniform distribution of hot air or steam over the length of the step. Alternatively, the sparger pipes can be perforated towards the top of the pipes.

In one embodiment, the heat source can be circulating hot sand.

In one embodiment, the heat source can be an electrical heater or electrical heating elements.

In order to facilitate initial start up of the gasifier, the gasifier can include access ports sized to accommodate various conventional burners, for example natural gas, oil/gas or propane burners, to pre-heat the chamber. Also, wood/biomass sources, engine exhausts, electric heaters could be used to preheat the chamber.

Process Additive Inputs

Process additives may optionally be added to the gasifier to facilitate efficient conversion of feedstock into specified gases. Steam input can be used to ensure sufficient free oxygen and hydrogen to maximize the conversion of decomposed elements of the input feedstock into product gas and/or non-hazardous compounds. Air input can be used to assist in processing chemistry balancing to maximize carbon conversion to a fuel gas (minimize free carbon) and to maintain the optimum processing temperatures while minimizing the cost of input heat.

Optionally, other additives may be used to optimize the process and thereby improve emissions.

The invention, therefore, can include one or more process additive inputs. These include inputs for steam injection and/or air injection. The steam inputs can be strategically located to direct steam into high temperature regions and into the product gas mass just prior to its exit from the gasifier. The air inputs can be strategically located in and around the gasifier chamber to ensure full coverage of process additives into the processing zone.

In one embodiment, the process additive inputs are located proximal to the floor of the gasifier.

In one embodiment, the process additive inputs located proximal to the floor are half-pipe air spargers trenched into the refractory floor. Such air spargers may be designed to facilitate replacement, servicing or modification while minimizing interference with the lateral transfer of reactant material. The number, diameter and placement of the air holes in the air spargers can be varied according to system requirements or lateral transfer system design.

In one embodiment, the process additive inputs are located in the floor of the gasifier. Such process additive inputs are designed to minimize plugging by fine particles or be equipped with an attachment to prevent plugging. Optionally, the process additive inputs can include a pattern of holes through which process additives can be added. Various patterns of holes can be used depending on system requirements or lateral transfer system design. In choosing the pattern of the airholes, factors to consider include avoiding high velocity which would fluidize the bed, avoiding holes too close to gasifier walls and ends so that channeling of air along refractory wall is avoided, and ensuring spacing between holes was no more than approximately the nominal feed particle size (2") to ensure acceptable kinetics.

In one embodiment, airhole pattern is arranged such that operation of the lateral transfer unit does interfere with the air passing through the airholes.

In one embodiment in which a multiple-finger ram is used, the pattern of the airholes is such that when heated the airholes are between the fingers (in the gaps) and are in arrow pattern with an offset to each other. Alternatively, the airhole pattern can also be hybrid where some holes are not covered and others are covered, such that even distribution of air is maximized (ie. areas of floor with no air input at all are minimized).

In one embodiment, the pattern of holes facilitates the even distribution of process additives over a large surface area with minimal disruption or resistance to lateral material transfer.

In one embodiment, the process additive inputs provide diffuse, low velocity input of additives.

In embodiments in which hot air is used to heat the chamber additional air/oxygen injection inputs may optionally be provided.

Service Ports

In one embodiment, the gasification chamber can further comprise one or more ports. These ports can include service ports (2020) to allow for entry into the chamber for maintenance and repair. Such ports are known in the art and can include sealable port holes of various sizes.

In one embodiment, access to the inside of the gasifier is provided by a manhole at one end which can be closed by a sealable refractory lined cover during operation.

In one embodiment, further access is available by removing one or more air boxes.

The gasifier can optionally include a flanged lower section which is connected to a flanged main section of the gasification chamber to facilitate opening of the gasification chamber for refractory inspection and repair.

Ash Removal System

The residual solids (ash) after gasification is complete can optionally be removed from the gasifier and passed to a handling system. The gasifier may therefore optionally include a controllable solids removal system to facilitate solid residue or ash removal.

In one embodiment, the controllable solids removal system comprises a ram mechanism to push the ash out of the chamber.

In one embodiment, the controllable solids removal system consists of a system of conveying rams. Optionally, the length of the ram stroke can be controlled so that the amount of material fed into a solid residue processing chamber with each stroke can be controlled.

In a further embodiment of the invention, the controllable solids removal system may comprise of a controllable rotating arm mechanism.

As the material is processed and is moved from region to region in the gasifier the heat generated within the pile can cause melting which will result in agglomeration of the ash. Agglomerated ash has been shown to cause jamming in drop port type exits. The invention therefore can optionally comprise a means for breaking up ash agglomerates.

In one embodiment, in order to ensure that any agglomerations do not create jamming at the exit from the chamber, a screw conveyor concept is used to extract the ash from the gasifier. The ram motion will push the ash into the extractor and the extractor will pull the ash out of the gasifier and feed it into an ash conveyor system. Rotation of the extractor screw breaks up agglomerations before the ash is fed into the conveyor system. This breaking up action can be enhanced by having serrations on the edge of the extractor screw flights.

Control

In one embodiment of the present invention, a control system may be provided to control one or more processes implemented in, and/or by, the various systems and/or subsystems disclosed herein, and/or provide control of one or more process devices contemplated herein for affecting such processes. In general, the control system may operatively control various local and/or regional processes related to a given system, subsystem or component thereof, and/or related to one or more global processes implemented within a system, such as a gasification system, within or in cooperation with which the various embodiments of the present invention may be operated, and thereby adjusts various control parameters thereof adapted to affect these processes for a defined result. Various sensing elements and response elements may therefore be distributed throughout the controlled system(s), or in relation to one or more components thereof, and used to acquire various process, reactant and/or product characteristics, compare these characteristics to suitable ranges of such characteristics conducive to achieving the desired result, and respond by implementing changes in one or more of the ongoing processes via one or more controllable process devices.

The control system generally comprises, for example, one or more sensing elements for sensing one or more characteristics related to the system(s), process(es) implemented therein, input(s) provided therefor, and/or output(s) generated thereby. One or more computing platforms are communicatively linked to these sensing elements for accessing a characteristic value representative of the sensed characteristic(s), and configured to compare the characteristic value(s) with a predetermined range of such values defined to characterise these characteristics as suitable for selected operational and/or downstream process results, and compute one or more process control parameters conducive to maintaining the characteristic value with this predetermined range. A plurality of response elements may thus be operatively linked to one or more process devices operable to affect the system, process, input and/or output and thereby adjust the sensed characteristic, and communicatively linked to the computing platform(s) for accessing the computed process control parameter(s) and operating the process device(s) in accordance therewith.

In one embodiment, the control system provides a feedback, feedforward and/or predictive control of various systems, processes, inputs and/or outputs related to the conversion of carbonaceous feedstock into a gas, so to promote an efficiency of one or more processes implemented in relation thereto. For instance, various process characteristics may be evaluated and controllably adjusted to influence these processes, which may include, but are not limited to, the heating value and/or composition of the feedstock, the characteristics of the product gas (e.g. heating value, temperature, pressure, flow, composition, carbon content, etc.), the degree of variation allowed for such characteristics, and the cost of the inputs versus the value of the outputs. Continuous and/or real-time adjustments to various control parameters, which may include, but are not limited to, heat source power, additive feed rate(s) (e.g. oxygen, oxidants, steam, etc.), feedstock feed rate(s) (e.g. one or more distinct and/or mixed feeds), gas and/or system pressure/flow regulators (e.g. blowers, relief and/or control valves, flares, etc.), and the like, can be executed in a manner whereby one or more process-related characteristics are assessed and optimized according to design and/or downstream specifications.

Alternatively, or in addition thereto, the control system may be configured to monitor operation of the various components of a given system for assuring proper operation, and optionally, for ensuring that the process(es) implemented thereby are within regulatory standards, when such standards apply.

In accordance with one embodiment, the control system may further be used in monitoring and controlling the total energetic impact of a given system. For instance, a a given system may be operated such that an energetic impact thereof is reduced, or again minimized, for example, by optimising one or more of the processes implemented thereby, or again by increasing the recuperation of energy (e.g. waste heat) generated by these processes. Alternatively, or in addition thereto, the control system may be configured to adjust a composition and/or other characteristics (e.g. temperature, pressure, flow, etc.) of a product gas generated via the controlled process(es) such that such characteristics are not only suitable for downstream use, but also substantially optimised for efficient and/or optimal use. For example, in an embodiment where the product gas is used for driving a gas engine of a given type for the production of electricity, the characteristics of the product gas may be adjusted such that these characteristics are best matched to optimal input characteristics for such engines.

In one embodiment, the control system may be configured to adjust a given process such that limitations or performance guidelines with regards to reactant and/or product residence times in various components, or with respect to various processes of the overall process are met and/or optimised for. For example, an upstream process rate may be controlled so to substantially match one or more subsequent downstream processes.

In addition, the control system may, in various embodiments, be adapted for the sequential and/or simultaneous control of various aspects of a given process in a continuous and/or real time manner.

In general, the control system may comprise any type of control system architecture suitable for the application at hand. For example, the control system may comprise a substantially centralized control system, a distributed control system, or a combination thereof. A centralized control system will generally comprise a central controller configured to communicate with various local and/or remote sensing devices and response elements configured to respectively sense various characteristics relevant to the controlled process, and respond thereto via one or more controllable process devices adapted to directly or indirectly affect the controlled process. Using a centralized architecture, most computations are implemented centrally via a centralized processor or processors, such that most of the necessary hardware and/or software for implementing control of the process is located in a same location.

A distributed control system will generally comprise two or more distributed controllers which may each communicate with respective sensing and response elements for monitoring local and/or regional characteristics, and respond thereto via local and/or regional process devices configured to affect a local process or sub-process. Communication may also take place between distributed controllers via various network configurations, wherein a characteristics sensed via a first controller may be communicated to a second controller for response thereat, wherein such distal response may have an impact on the characteristic sensed at the first location. For example, a characteristic of a downstream product gas may be sensed by a downstream monitoring device, and adjusted by adjusting a control parameter associated with the converter that is controlled by an upstream controller. In a distributed architecture, control hardware and/or software is also distributed between controllers, wherein a same but modularly configured control scheme may be implemented on each controller, or various cooperative modular control schemes may be implemented on respective controllers.

Alternatively, the control system may be subdivided into separate yet communicatively linked local, regional and/or global control subsystems. Such an architecture could allow a given process, or series of interrelated processes to take place and be controlled locally with minimal interaction with other local control subsystems. A global master control system could then communicate with each respective local control subsystems to direct necessary adjustments to local processes for a global result.

The control system of the present invention may use any of the above architectures, or any other architecture commonly known in the art, which are considered to be within the general scope and nature of the present disclosure. For instance, processes controlled and implemented within the context of the present invention may be controlled in a dedicated local environment, with optional external communication to any central and/or remote control system used for related upstream or downstream processes, when applicable.

Alternatively, the control system may comprise a sub-component of a regional an/or global control system designed to cooperatively control a regional and/or global process. For instance, a modular control system may be designed such that control modules interactively control various sub-components of a system, while providing for inter-modular communications as needed for regional and/or global control.

The control system generally comprises one or more central, networked and/or distributed processors, one or more inputs for receiving current sensed characteristics from the various sensing elements, and one or more outputs for communicating new or updated control parameters to the various response elements. The one or more computing platforms of the control system may also comprise one or more local and/or remote computer readable media (e.g. ROM, RAM, removable media, local and/or network access media, etc.) for storing therein various predetermined and/or readjusted control parameters, set or preferred system and process characteristic operating ranges, system monitoring and control software, operational data, and the like. Optionally, the computing platforms may also have access, either directly or via various data storage devices, to process simulation data and/or system parameter optimization and modeling means. Also, the computing platforms may be equipped with one or more optional graphical user interfaces and input peripherals for providing managerial access to the control system (system upgrades, maintenance, modification, adaptation to new system modules and/or equipment, etc.), as well as various optional output peripherals for communicating data and information with external sources (e.g. modem, network connection, printer, etc.).

The processing system and any one of the sub-processing systems can comprise exclusively hardware or any combination of hardware and software. Any of the sub-processing systems can comprise any combination of none or more proportional (P), integral (I) or differential (D) controllers, for example, a P-controller, an I-controller, a PI-controller, a PD controller, a PID controller etc. It will be apparent to a person skilled in the art that the ideal choice of combinations of P, I, and D controllers depends on the dynamics and delay time of the part of the reaction process of the gasification system and the range of operating conditions that the combination is intended to control, and the dynamics and delay time of the combination controller. It will be apparent to a person skilled in the art that these combinations can be implemented in an analog hardwired form which can continuously monitor, via sensing elements, the value of a characteristic and compare it with a specified value to influence a respective control element to make an adequate adjustment, via response elements, to reduce the difference between the observed and the specified value. It will further be apparent to a person skilled in the art that the combinations can be implemented in a mixed digital hardware software environment. Relevant effects of the additionally discretionary sampling, data acquisition, and digital processing are well known to a person skilled in the art. P, I, D combination control can be implemented in feed forward and feedback control schemes.

In corrective, or feedback, control the value of a control parameter or control variable, monitored via an appropriate sensing element, is compared to a specified value or range. A control signal is determined based on the deviation between the two values and provided to a control element in order to reduce the deviation. It will be appreciated that a conventional feedback or responsive control system may further be adapted to comprise an adaptive and/or predictive component, wherein response to a given condition may be tailored in accordance with modeled and/or previously monitored reactions to provide a reactive response to a sensed characteristic while limiting potential overshoots in compensatory action. For instance, acquired and/or historical data provided for a given system configuration may be used cooperatively to adjust a response to a system and/or process characteristic being sensed to be within a given range from an optimal value for which previous responses have been monitored and adjusted to provide a desired result. Such adaptive and/or predictive control schemes are well known in the art, and as such, are not considered to depart from the general scope and nature of the present disclosure.

Control Elements

Sensing elements contemplated within the present context, as defined and described above, can include, but are not limited to, temperature sensing elements, position sensors, proximity sensors, pile height sensors and means for monitoring gas.

In one embodiment, the gasifier further comprises a temperature sensor array comprising one or more removable thermocouples. The thermocouples can be strategically placed to monitor temperature at points along each stage and at various heights at each stage.

Appropriate thermocouples are known in the art and include bare wire thermocouples, surface probes, thermocouple probes including grounded thermocouples, ungrounded thermocouples and exposed thermocouples or combinations thereof.

In one embodiment, individual thermocouples are inserted into the chamber via a sealed end tube (thermowell) which is then sealed to the vessel shell, allowing for the use of flexible wire thermocouples which are procured to be longer than the sealing tube so that the junction (the temperature sensing point) of the thermocouple is pressed against the end of the sealed tube to assure accurate and quick response to temperature change (see FIG. 28).

Optionally, to prevent material from getting blocked by the thermocouple tube the end of the sealed tube cap can be fitted with a deflector. In one embodiment, the deflector is a square flat plate, with bent corners that contact the refractory and are in-line with reactant material flow to slip-stream particles over the thermowell (see FIG. 28).

In addition, the invention may comprise devices for monitoring the exit of gas. In one embodiment this can include a gas composition monitor and gas flow meter.

By measuring process temperatures throughout the material pile, gas phase temperatures above the pile, and by measuring resultant off-gas flowrate and analyzing off-gas composition, the amount of air injected can be optimized to maximize efficiency and minimize undesirable process characteristics and products including slagging of ash, combustion, poor off-gas heating value, excessive particulate matter and dioxin/furan formation thereby meeting or bettering local emission standards. Such measurements can be taken during initial start-up or initially testing of the gasifier, periodically or continually during operation of the gasifier and may optionally be taken in real time.

In one embodiment, the gasifier can optionally comprise a pressure sensor or monitor within the gasifier.

The gasifier can further comprise level switches or monitors to assess pile height. Appropriate level switches, sensors and monitors are known in the art. In one embodiment, the level instrumentation comprises point-source level switches.

In one embodiment, the level switches are microwave devices with an emitter on one side of the chamber and a receiver on the other side, which detects either presence or absence of solid material at that point inside the gasification chamber.

A worker skilled in the art would readily be able to determine the appropriate placement of level switches, sensors and monitors such that the desired reactant material pile profile can be obtained.

In one embodiment, the gasifier further comprises proximity or position sensors.

Response elements contemplated within the present context, as defined and described above, can include, but are not limited to, various control elements operatively coupled to process-related devices configured to affect a given process by adjustment of a given control parameter related thereto. For instance, process devices operable within the present context via one or more response elements, may include, but are not limited to elements controlling chamber heating, elements controlling process additives and elements controlling lateral transfer system movement.

Control System for the Lateral Transfer System

A level control system is required to maintain stable pile height inside the gasifier. Stable level control prevents fluidization of the reactant material from process air injection which could occur at low level and to prevent poor temperature distribution through the pile owing to restricted airflow that would occur at high level. Maintaining stable level also maintains consistent gasifier residence time by keeping the volume of reacting material constant.

Optionally, a series of level switches in the gasifier measure pile depth. The level switches are optionally microwave devices with a emitter on one side of the chamber and a receiver on the other side, which detects either presence or absence of solid material at that point inside the gasifier.

The lateral transfer units move as necessary to ensure that pile height is controlled at the desired level. To accomplish this in embodiments in which the lateral transfer units comprise rams, the rams move in a series of programmed step of which there are several key control parameters including: specific ram movement sequence, ram speed, ram distance, and ram sequence frequency.

In general, rams move out to a set point distance, or until a controlling level switch is tripped; either at the same time or in a pre-determined sequence. The level switch control action can be based on a single switch, tripping either empty or full, or may require multiple switches tripping, empty or full, or any combination thereof. Afterwards, the rams move back to end the cycle, and the process is repeated. There is an optional delay between cycles as required by the process and residence time requirements of the gasifier.

To ensure efficient movement of material in the stepped-floor embodiments, the sequencing of lateral transfer unit movement can be optimized by starting at the lowest level of the gasifier, creating a pocket, then filling it from the step above before the lateral transfer unit's moving element is retracted to prevent pull back of the pile and then repeating up the steps.

In one embodiment, the ram sequencing comprises the lowest ram is extended first; the middle ram is then extended which pushes material down onto the lowest ram filling the void created by that rams movement; the lowest ram is then retracted; the upper ram is then extended filling the void at the back of the middle ram; the middle ram is then retracted; new material dropping from the feed port fills any void on the top ram and the top ram is retracted. Optionally, all of these motions can be controlled automatically and independently by the control system in response to system instrumentation data.

In one three-step embodiment, the gasifier throughput is set by adjusting the volumetric feed rate into the gasifier. The level control system then controls the lateral transfer unit's moving elements as needed to control level of the pile on each step on aim, which includes controlling the rate of ash discharge from the gasifier.

In one three-step embodiment, the Step C lateral transfer unit's moving element sets gasifier throughput by moving a fixed length in relation to location indicator or guide point and frequency to discharge ash from the gasifier. The Step B lateral transfer unit's moving element follows and moves as far as necessary to translocate material onto Step C and change the Step C start-of-stage level switch state to "full". The Step A lateral transfer unit's moving element follows and moves as far as necessary to push material onto Step B and change the Step B start-of-stage level switch state to "full". All lateral transfer units' moving elements are then withdrawn simultaneously, and a scheduled delay can be executed before the entire sequence is repeated. Additional configuration may be used to limit the change in consecutive stroke lengths to less than that called for by the level switches to avoid excess lateral transfer unit-induced disturbances.

Optionally, full extension of the lateral transfer unit's moving element to the end of each step may need to be programmed to occur occasionally to prevent stagnant material from building up and agglomerating near the end of the step.

Temperature Control

In order to get the best possible conversion efficiency, the temperatures in the gasifier and temperature distribution through the pile can be stabilized and controlled.

Temperature control within the pile can be achieved by changing the flow of process air into a given region or step. The process air flow provided to each step in the bottom chamber can be adjusted to stabilize temperatures in each step. Optionally, temperature control utilizing extra lateral transfer unit's moving element may also be necessary to break up hot spots and to avoid bridging.

In one embodiment, temperature control within the pile is achieved by changing the flow of process air into a given step (ie. more or less combustion). For example, the process air flow provided to each step in the gasifier may be adjusted by the control system to stabilize temperatures at step. Temperature control utilizing extra ram strokes may also be used to break up hot spots and to avoid bridging.

In one embodiment, the air flow at each step is pre-set to maintain substantially constant temperature ranges and ratios between steps. For example, about 36% of the total air flow may be directed to Step A, about 18% to Step B, and about 6% to Step C, the remainder being directed to an attached gas reformulating chamber (e.g. 40% of total air flow). Alternatively, air input ratios may be varied dynamically to adjust temperatures and processes occurring within each step of the gasifier and/or reformer.

Downstream Options

The gasifier of the invention can be adapted for a variety of applications including waste disposal and syngas production. The gasifier can therefore be a component of a larger system depending on the application.

In one embodiment, the gasifier is adapted for waste disposal applications and is in gaseous communication with a flare stack fitted with appropriate pollution abatement devices.

In one embodiment, the gasifier is a component of a syngas generating system and comprises a cyclonic oxidizer, a gas refinement system or a gas reformulating system.

In one embodiment, the gasifier is a component of a hazardous treatment facility.

Cyclonic oxidizer, a gas refinement system or a gas reformulating system utilize a plasma heat source to refine the off-gas.

EXAMPLES

Example 1

Referring to FIGS. 4 to 10, in one embodiment, the gasifier (2100) comprises a refractory-lined horizontally-oriented gasification chamber (2102) having a feedstock input (2104), gas outlet (2106), a solid residue outlet (2108), and various service (2120) and access ports (2122). The gasification chamber (2102) has a stepped floor with a plurality of floor levels (2112, 2114 and 2116). Each floor level is sloped between about 5 and about 10 degrees. Each floor level has a series of additive inputs (2126) located in the side walls proximal to the floor level to allow for the addition of oxygen and/or steam.

Movement through the steps is facilitated by the lateral transfer system. In this example, FIGS. 4 to 9, the lateral transfer system comprises a series of moving shelf units (2128, 2130, 2132) in which material is predominantly moved through the gasifier by sitting on top of the shelf with a small fraction of material being pushed by the leading edge of the shelf. As shown, each floor level is serviced by a moving shelf unit (2128, 2130, 2132) mounted on an external frame (2134). Corresponding sealable openings in the gasification chamber walls allow for entry of each moving shelf. Thus the moving shelf units (2128, 2130, 2132) are capable of moving material along floor levels (2112, 2114, 2116) respectively at a controlled rate. The distance individual shelves travel across their respective step is controlled by an externally mounted controller. The ability to control the start and the stop point for each push allows for control of pile height through the gasification chamber. In normal operation, after material has been moved as required, the shelf may be fully or partially withdrawn from the chamber; for example, the shelf may be withdrawn just out of the processing region but still inside the refractory, to permit processing gas to be introduced from the bed of the chamber. This is particularly applicable to the final processing zone where the material is more dust-like and needs to be fluidized by multiple gas introduction points from the floor of the chamber. Withdrawal of the shelf also avoids unnecessary heating of the shelf and loss of heat from the process.

The externally mounted controller is a gearhead synchronous motor (2156) coupled to the moving shelf by means of roller chains (2166). Start and stop points for moving shelf motion is remotely controlled by a process computer. Speed and frequency of motion is also controlled by the computer.

Figure 8:
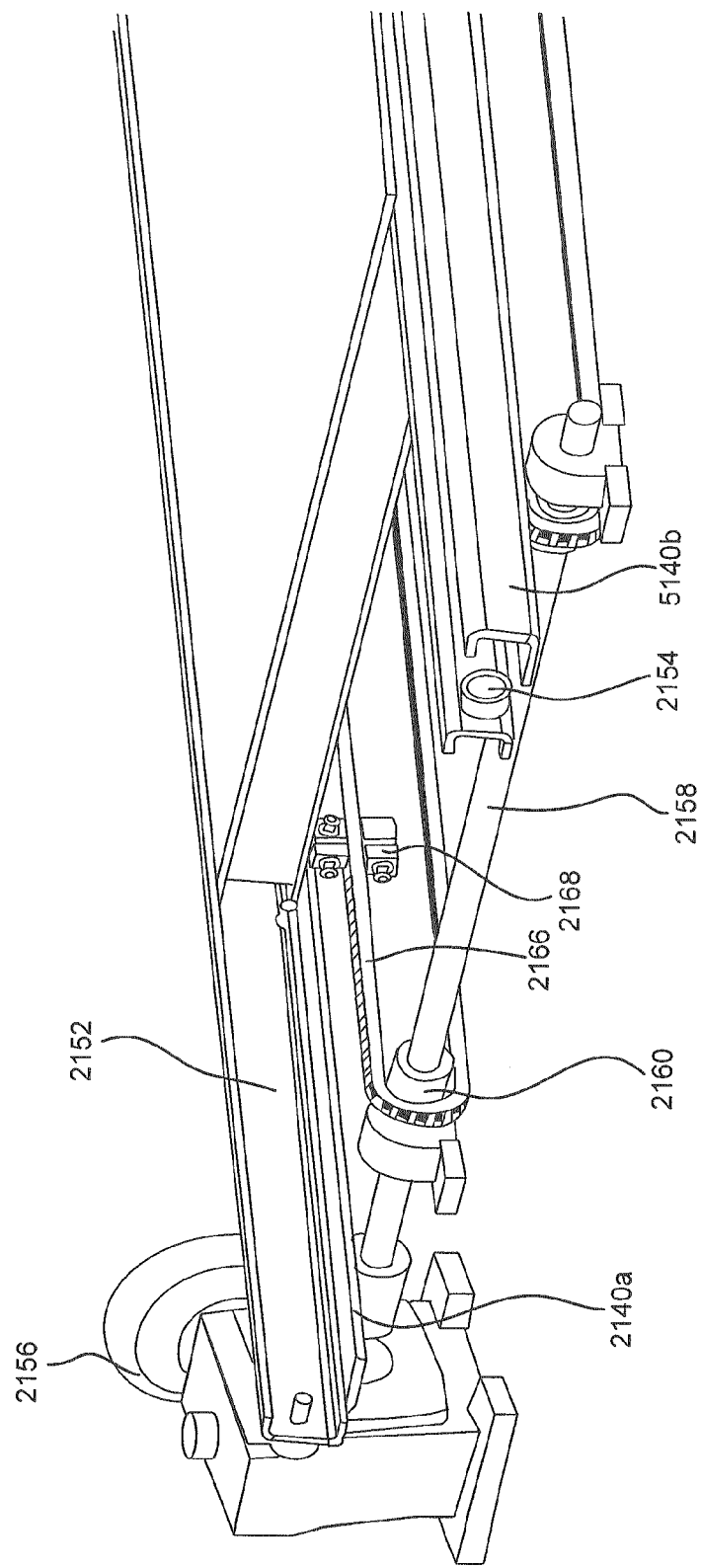
FIG. 8 illustrates a portion of a lateral transfer unit of the gasifier illustrated in FIGS. 4 to 6.
Figure 9:
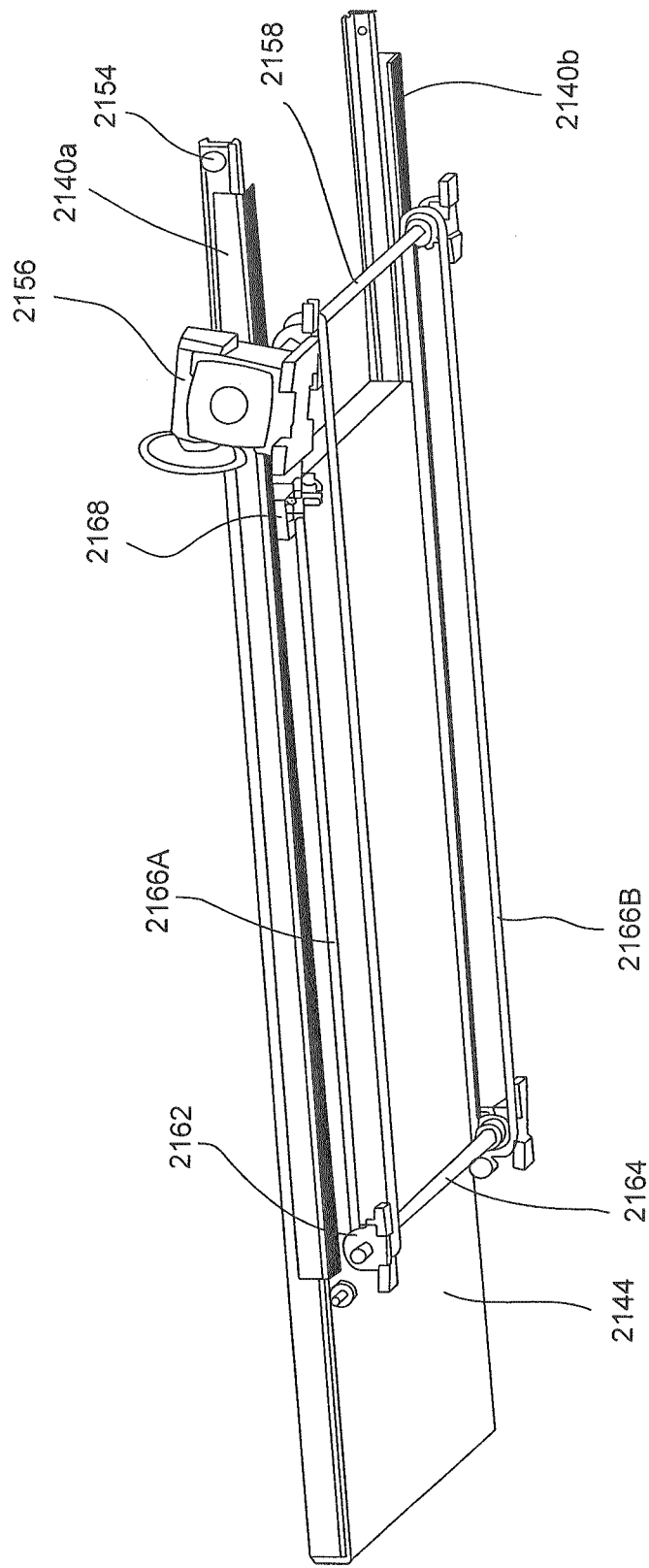
FIG. 9 illustrates a bottom view of the lateral transfer unit illustrated in FIG. 8.
Figure 10:
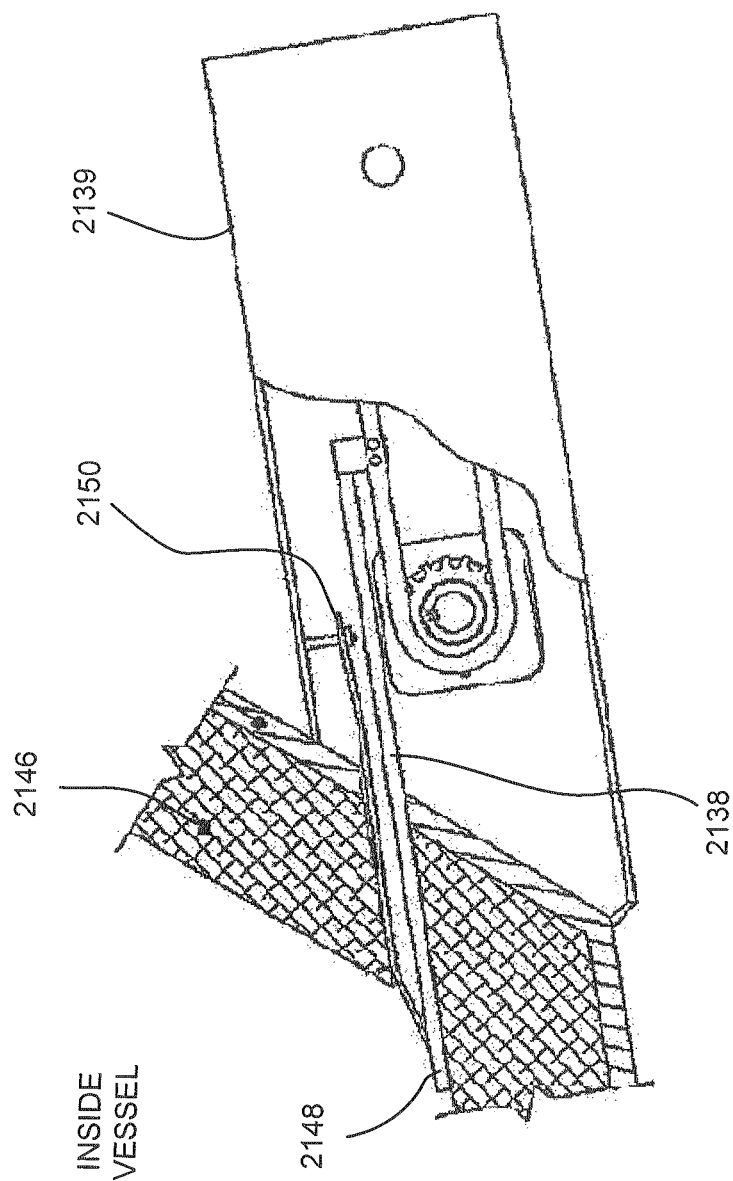
FIG. 10 illustrates an alternative embodiment of the lateral transfer unit illustrated in FIG. 8.
Figure 11:
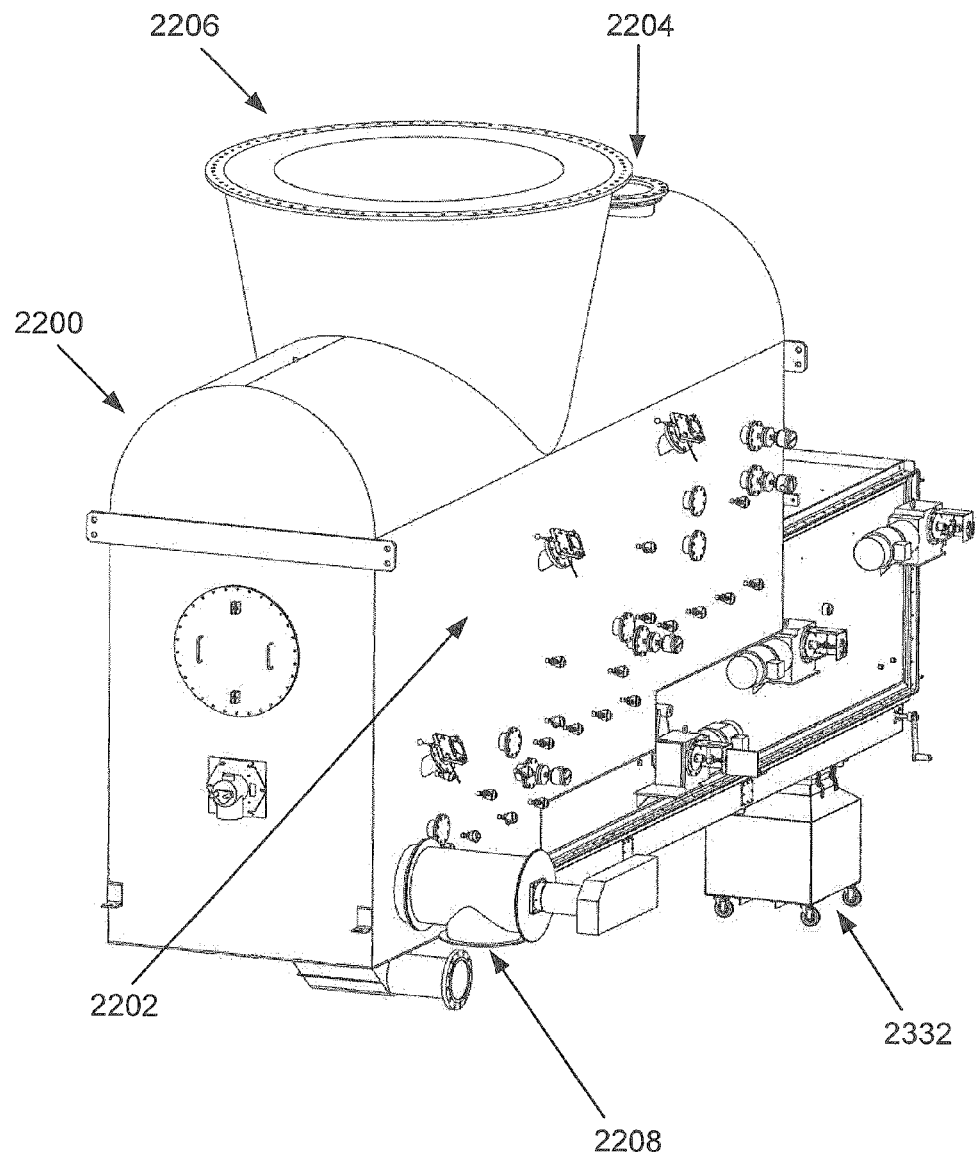
FIG. 11 is a perspective view of one embodiment of the gasifier, detailing the feedstock input, gas outlet, ash outlet, ram enclosure and access ports.
Figure 12:
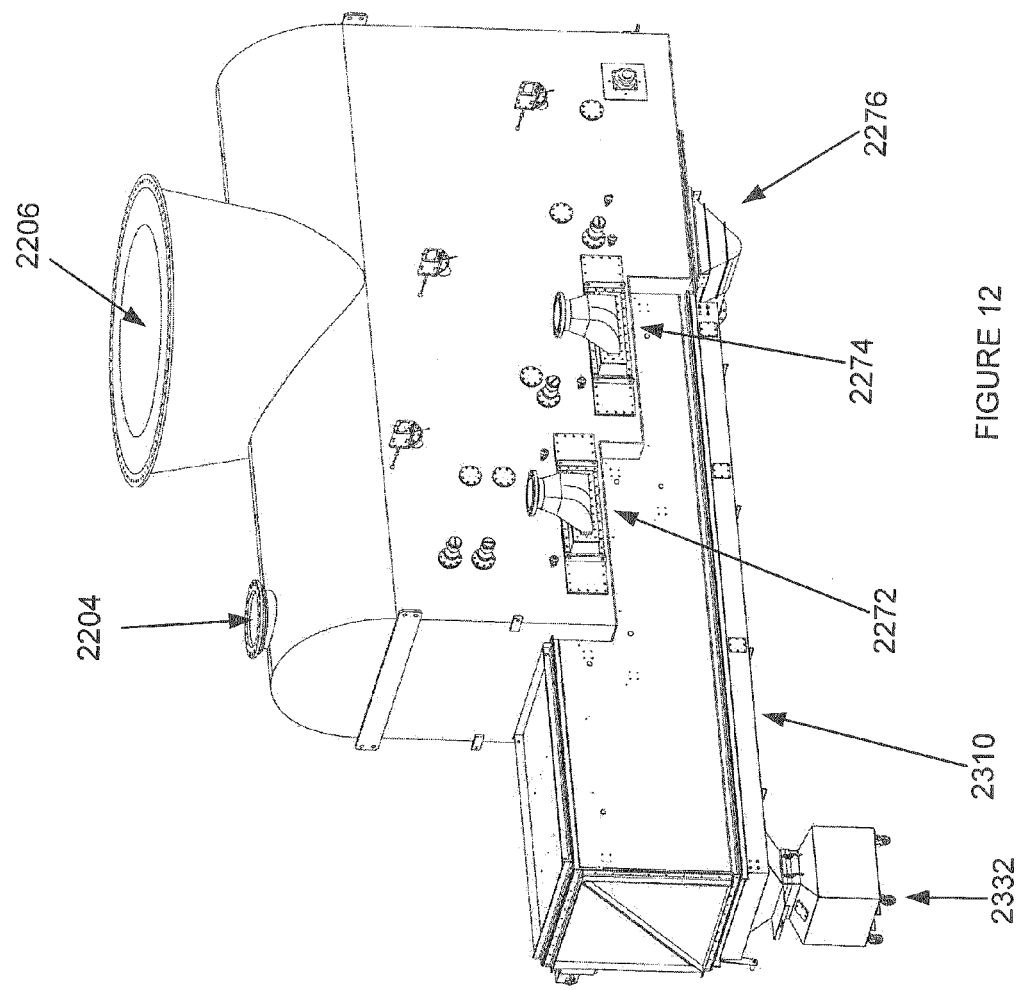
FIG. 12 is a side view of the gasifier illustrated in FIG. 11 detailing the air boxes, ash can and dust collector.
Figure 13:
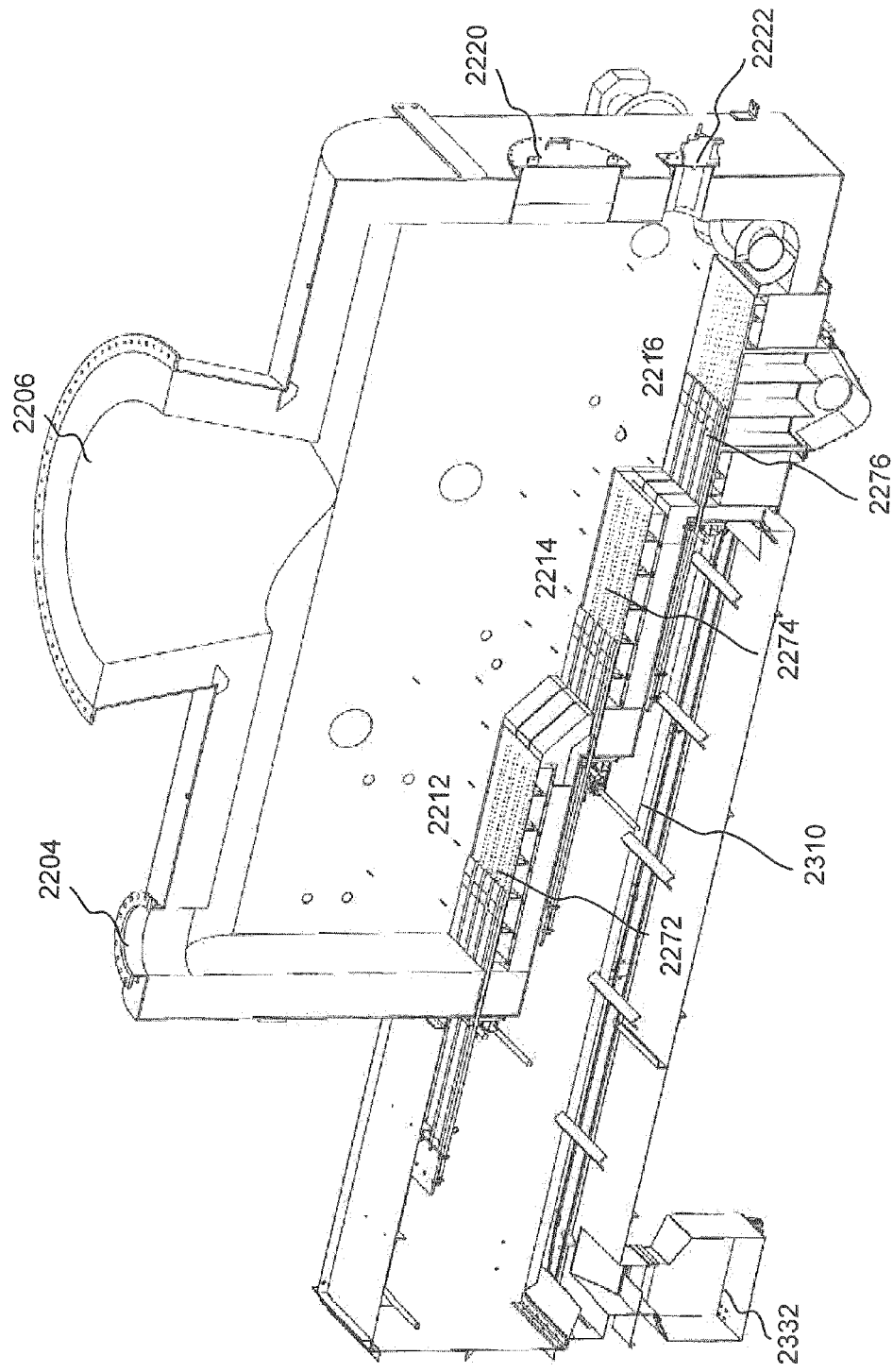
FIG. 13 is a central longitudinal cross-sectional view through the gasifier illustrated in FIGS. 11 and 12, detailing the feedstock input, gas outlet, ash outlet, lateral transfer system, thermocouples and access ports.
Figure 14:
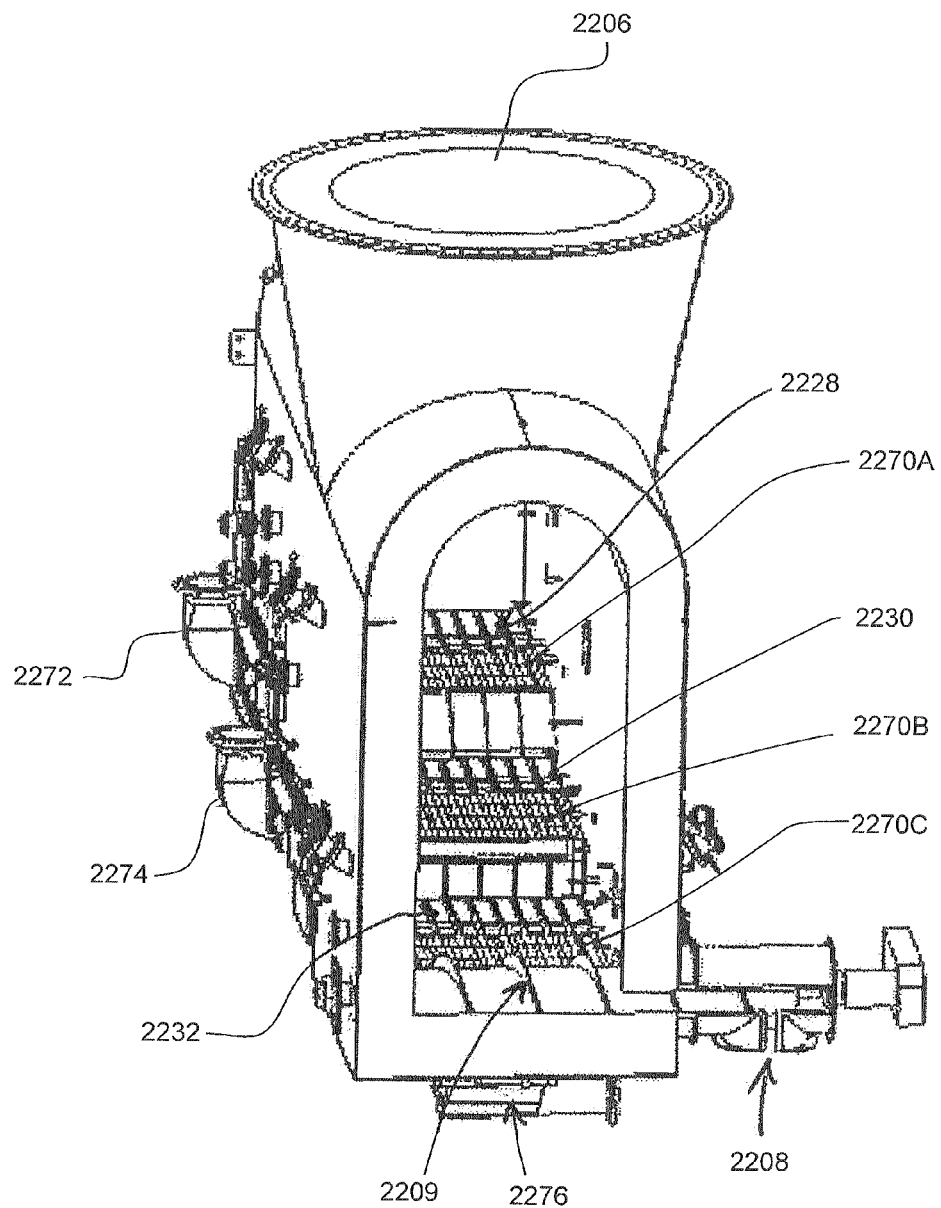
FIG. 14 illustrates a cross sectional view of the gasifier of FIGS. 11 to 13 detailing the air boxes, ram fingers and ash extractor screw.
Figure 15:
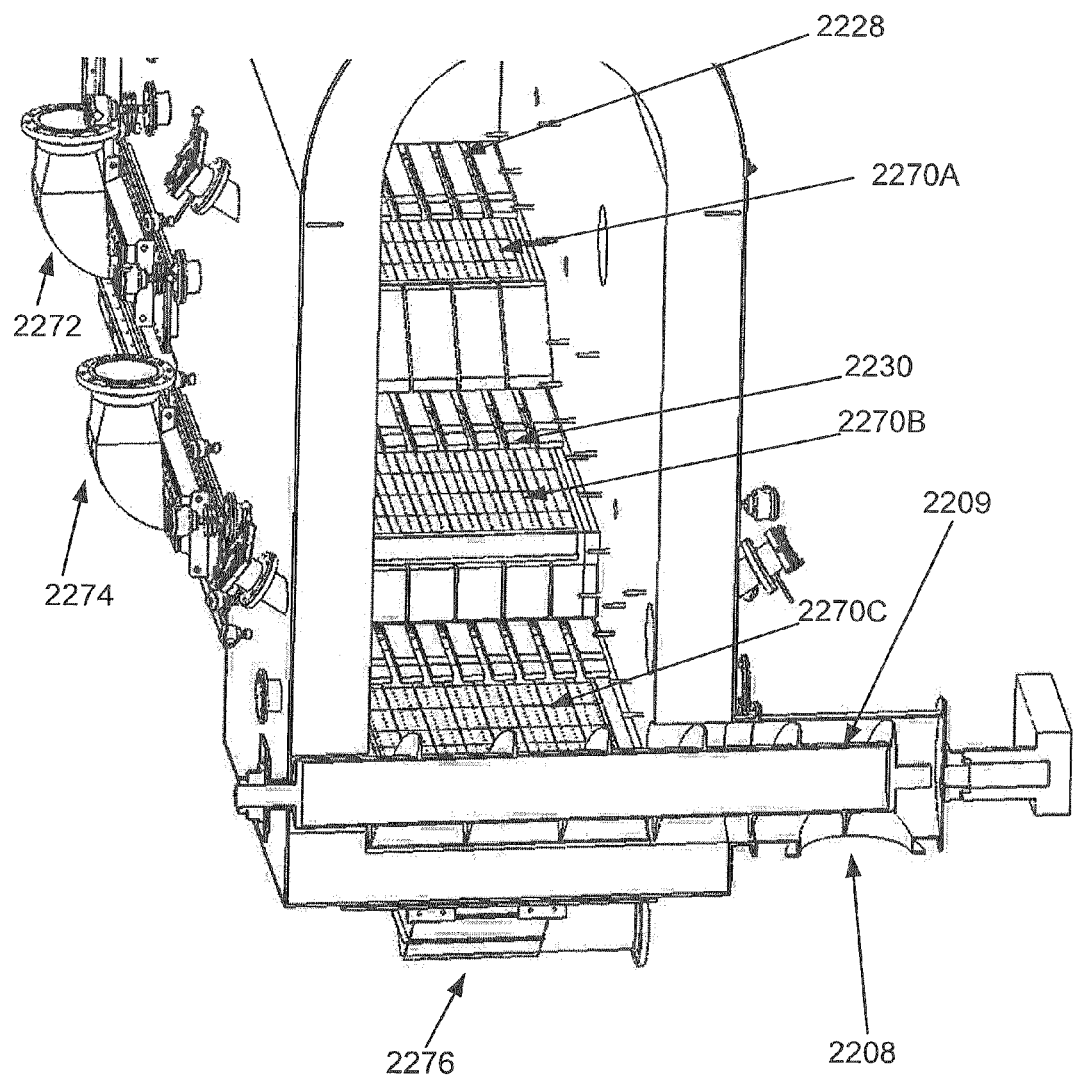
FIG. 15 illustrates a close-up cross sectional view of FIG. 14 detailing the air boxes, ram fingers, ash extractor screw and serrated edge of step C.

Referring now to FIGS. 8, 9 and 10, each moving shelf unit comprises an externally mounted guide portion (2136), moving element or shelf (2138) having guide portion engagement members, externally mounted drive system and an externally mounted controller. The externally mounted portions of the moving shelf units is housed in a sealed enclosure (2139). The enclosure further comprises a removable cover to allow for maintenance.

Referring to FIGS. 8 and 9, the guide portion comprises a pair of generally parallel elongated tracks (2140(a), 2140(b)) mounted on the frame (shown in part) (2134). The angle of the individual tracks corresponding in general to the slope of the corresponding step. Each of the tracks has a substantially rectangular cross-section. The moving element comprises an elongated rectangular block (2144) sized to slidably move through the corresponding sealable opening in the chamber wall.

Referring to FIG. 10, the leading edge of the elongated rectangular block is substantially perpendicular to the floor of the gasification chamber. The leading lower edge of the elongated rectangular block that contacts the refractory (2146) of the chamber is sharp to reduce the risk of riding up on top of the material and jamming the mechanism. The sharp leading edge is designed to be effectively self-sharpening. As it is sliding flat against the refractory floor there will be a slight wearing of the bottom surface of the shelf (2128), thus tending to sharpen the forward edge. The shelf is designed to be easily removable for maintenance that could include replacement of the endpiece or grinding of the fixed end.

The elongated rectangular block is adapted to sealingly engage the chamber wall and has substantially smooth parallel faces such that it is possible to obtain sealing against each face to prevent material egress and air ingress during normal process operation, and also to control hazardous gas escape during abnormal situations. The seal is located at the inside face of the refractory and is resiliently held against the sliding faces of the shelves. This minimizes material escape and gas leakage and precludes the likelihood of jamming of a shelf. The seals (2148) are designed to be easily replaceable during operation and are manufactured from stainless steel.

As shown in FIG. 10, the moving shelf further comprise a scraper (2150) to remove material from the shelf as it is withdrawn (or partially withdrawn) from the chamber. The scraper is a one-piece sheet metal part fixed to outside frame and is designed to be readily replaceable during operation.

The elongated rectangular block (2144) is mounted on substantially parallel brackets. Each bracket having at least two guide engagement members (2154). The guide engagement members illustrated in FIG. 8 are rollers sized to movably engage the track (2140(a) or 2140(b)).

Power to propel the elongated rectangular block along the tracks is supplied by a externally mounted electric variable speed motor (2156) which drives a motor output shaft (2158) selectably in the forward or reverse direction allowing for extension and retraction of the elongated rectangular block at a controlled rate. A slip clutch is provided between the motor (2156) and the motor output shaft (2158). The motor further comprise a gear box. Two driver sprocket gears (2160) are mounted on the motor output shaft. The driver sprockets (2160) and corresponding driven sprockets (2162) mounted on an axle (2164) operatively mesh with chain members (2166) which are secured by brackets (2168) to the elongated rectangular block (2144).

The ram stroke is controlled by proximity and limit switches so that the amount of material fed into the chamber with each stroke is controlled. A switch is also used to verify the start position of the rams and length and speed is then controlled by a variable frequency drive in the motor controller.

Example 2

Referring to FIGS. 11 to 25, in one embodiment the gasifier (2200) comprises a refractory-lined horizontally-oriented gasification chamber (2202) having a feedstock input (2204), gas outlet (2206), a solid residue outlet (2208), and various service (2220) and access ports (2222). The gasification chamber (2202) is a refractory-lined steel weldment having a stepped floor with a plurality of floor levels (2212, 2214 and 2216).

The solid residue outlet is equipped with an ash extractor comprising an extractor screw (2209) which will pull the ash out of the gasifier and feed it into an ash conveyor system.

Figure 16:
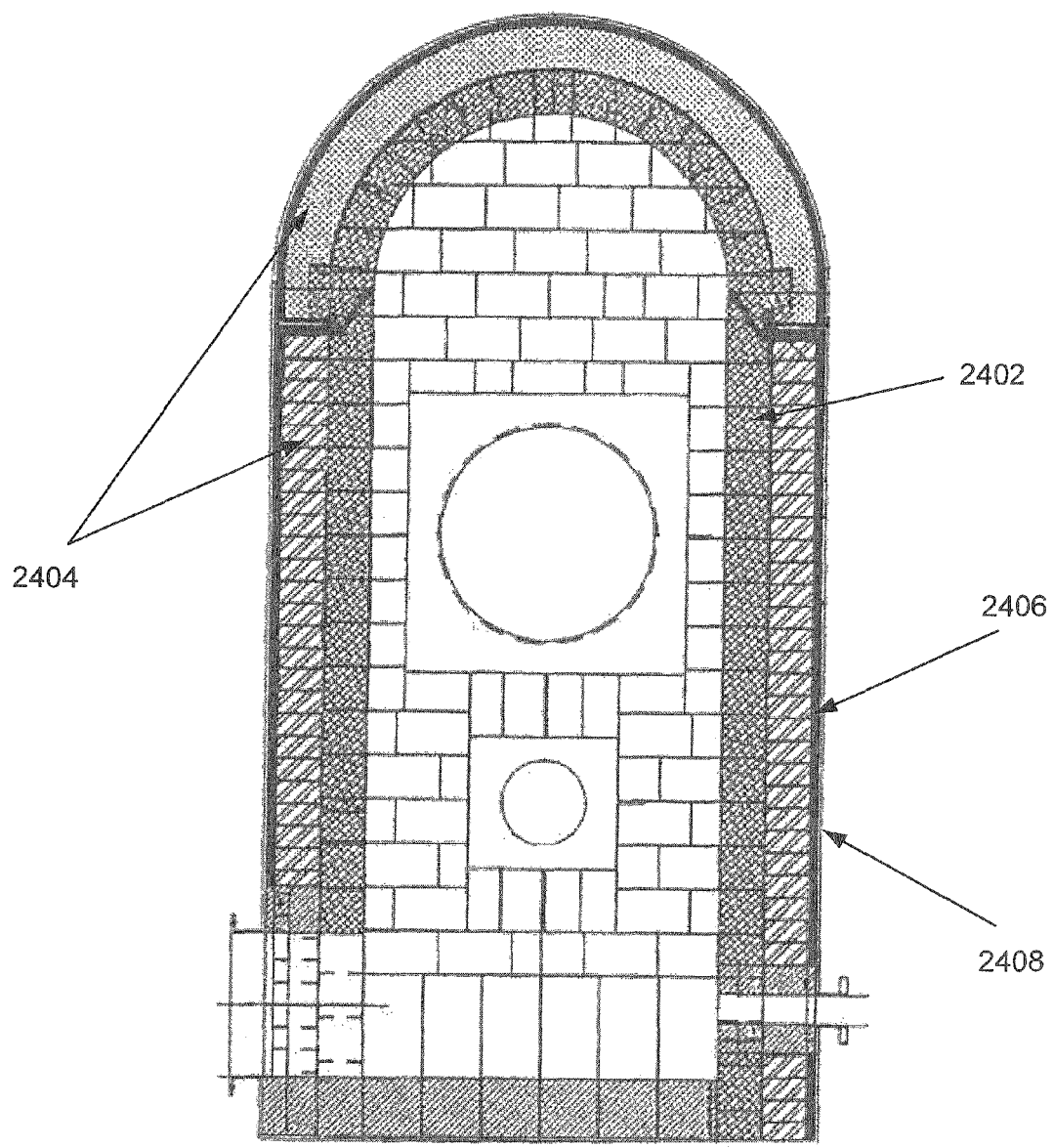
FIG. 16 is a sectional view of the gasifier of FIGS. 11 to 12 detailing the refractory.

Referring to FIG. 16, the refractory is a multilayer design with a high density chromia layer (2402) on the inside to resist the high temperature, abrasion, erosion and corrosion, a middle, high density alumina layer with medium temperature resistance and insulation factor (2404) and an outer very low density insboard material with very high insulation factor (2406) that can be used because it will not be exposed to abrasion of erosion. The refractory lines the metal shell (2408) of the gasification chamber.

Each level or step has a perforated floor (2270) through which heated air is introduced. To avoid blockage of the air holes during processing, the air hole size is selected such that it creates a restriction and thus a pressure drop across each hole. This pressure drop is sufficient to prevent waste particles from entering the holes. The holes are tapered outwards towards the upper face to preclude particles becoming stuck in a hole. In addition, the movement of the lateral transfer units may dislodge any material blocking the holes.

The air feed for each level or step is independently controllable. Independent air feed and distribution through the perforated floors (2270A, 2270B, 2270C) of each step is achieved by a separate air box (2272, 2274, and 2276) which forms the floor at each step.

Figure 17:
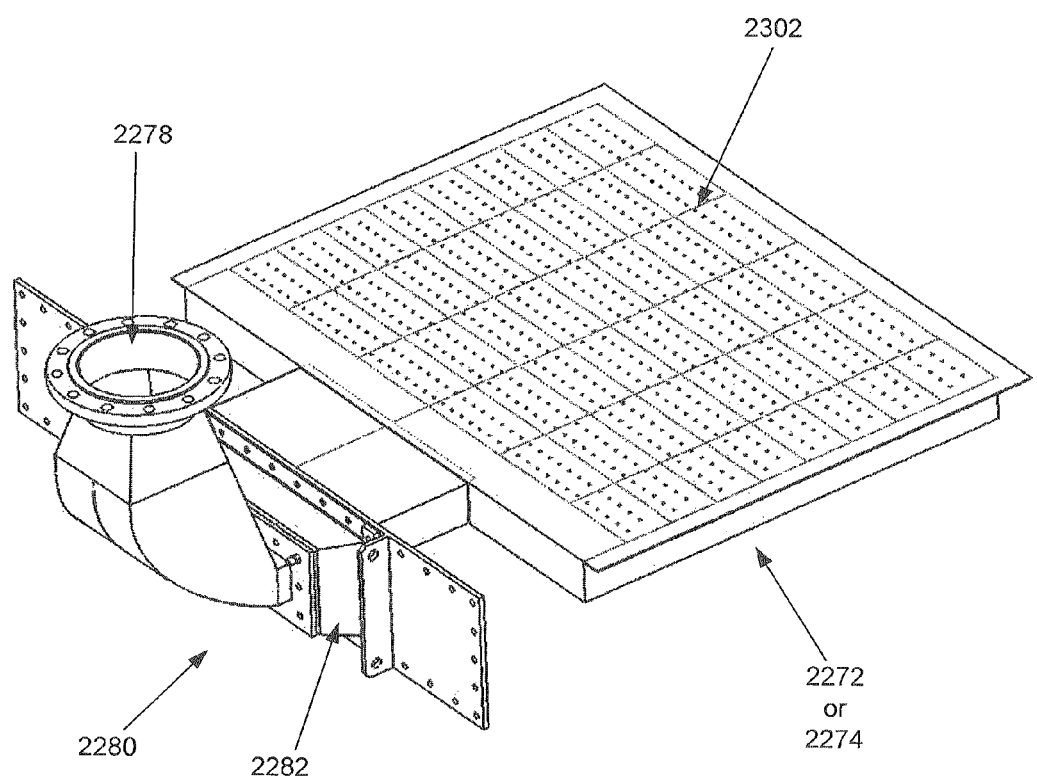
FIG. 17 details the air box assembly of Step A and B of the gasifier illustrated in FIGS. 11 to 16.
Figure 18:
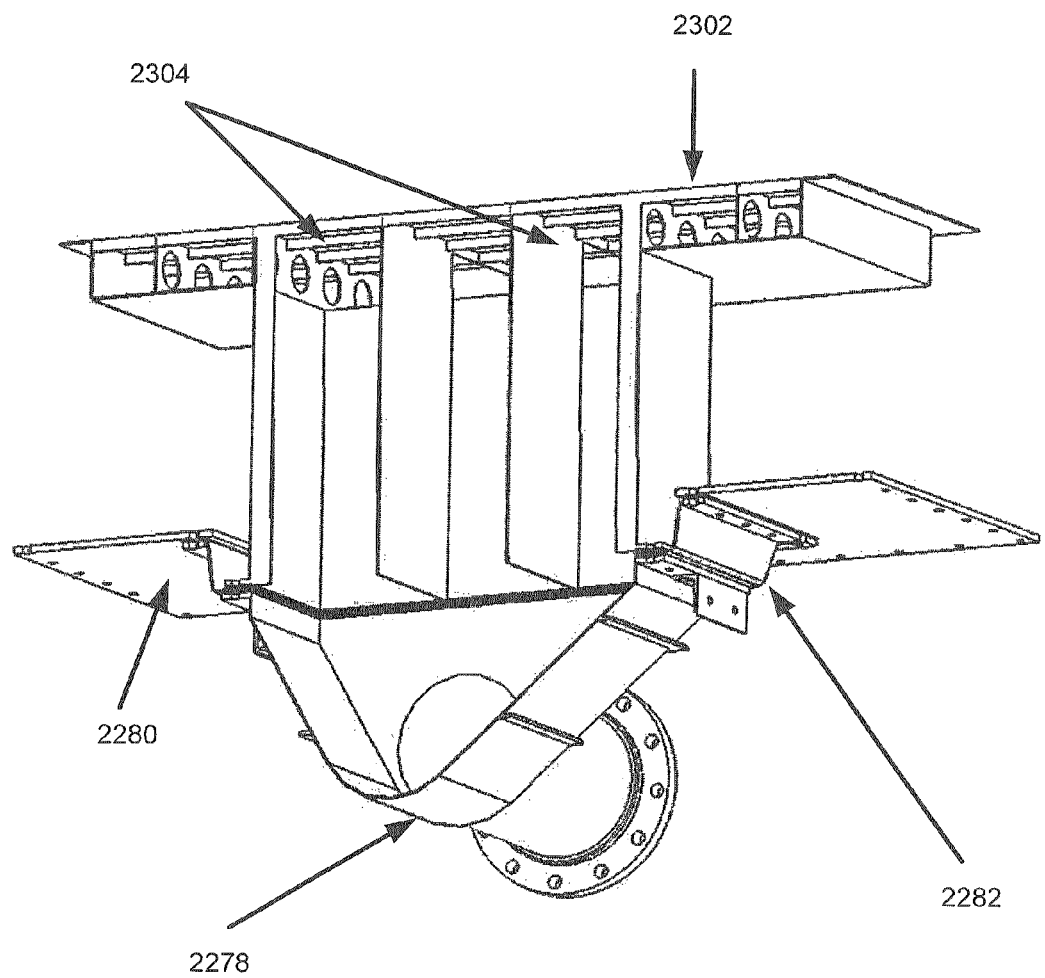
FIG. 18 illustrates a cross sectional view of the Step C air box of the gasifier illustrated in FIGS. 11 to 16.

Referring to FIGS. 17 and 18, to reduce the risk of stress-related failure or buckling of the air box, several features are included. The material for the perforated top plate (2302) of the air boxes is an alloy that meets the corrosion resistance requirements for the system. The perforated top sheet (2302) is relatively thin, with stiffening ribs and structural support members (2304) to prevent bending or buckling.

To minimize stress on the flat front, top and bottom sheets of the boxes, perforated webs is attached between both sheets. To allow for thermal expansion in the boxes they are attached only at one edge and are free to expand at the other three edges.

Referring to FIG. 17, the fixed edge of the Step A & B boxes (2272 and 2274) is also the connection point of the input air piping (2278) thus, the connection flange (2280) will be at high temperature and must be sealed to the cool wall of the gasifier. A shroud concept is used. The hot air box (2272) and pipe (2278) are attached to one end of the shroud and the other end of the shroud (2282) is connected to the cool gasifier (2200). A temperature gradient will occur across the length of the shroud (2282), thus there will be little or no stress at either connection. The space between the shroud (2282) and the internal duct of the air box (2272) is filled with insulation to retain heat and to ensure the temperature gradient occurs across the shroud. When the air box 2270A, (2272) is in its operating location in the chamber the top plate opposite to the air connection is extended beyond the air box to rest on a shelf of refractory. This provides support to the air box when operating and also acts as a seal to prevent material from falling below the air box. At the same time it allows free movement to allow for expansion of the air box.

Figure 21:
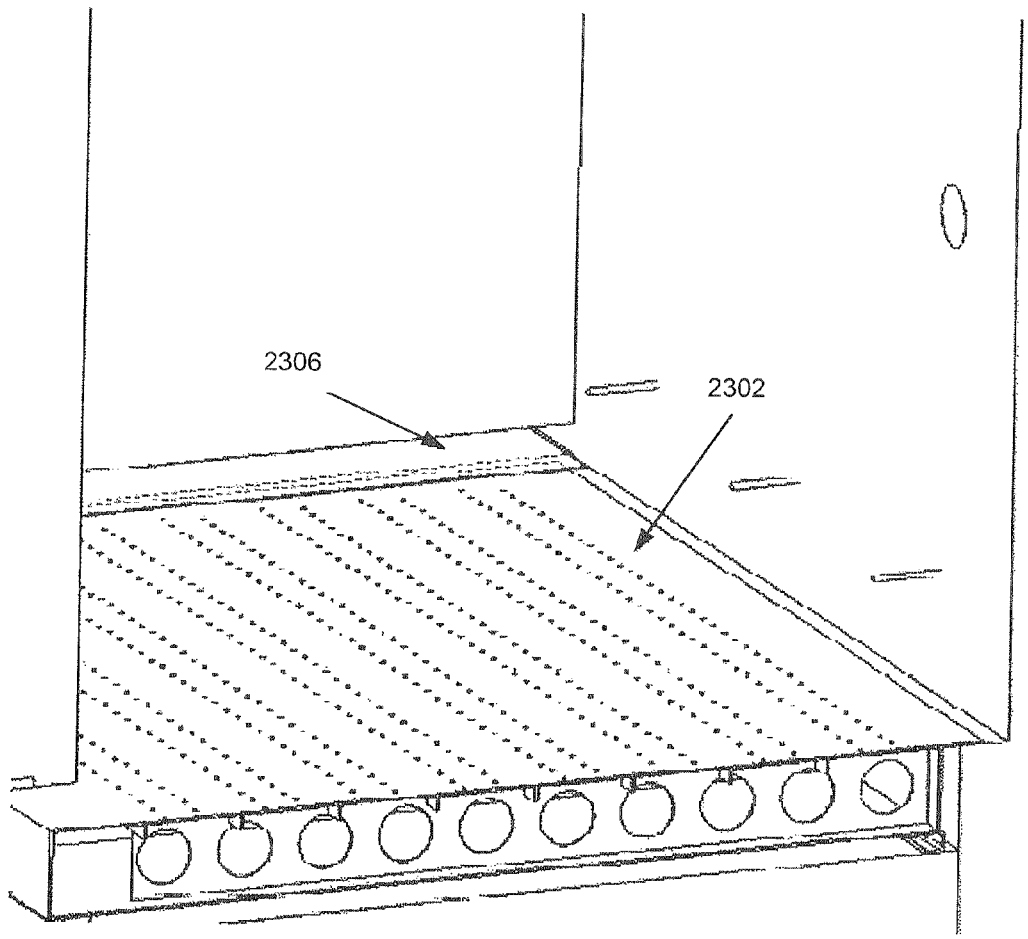
FIG. 21 illustrates a cross sectional view of the gasifier of FIGS. 11 to 16 detailing the sealing of the upstream edge of the air box with a resilient sheet sealing between the carrier ram and the air box top plate.
Figure 22:
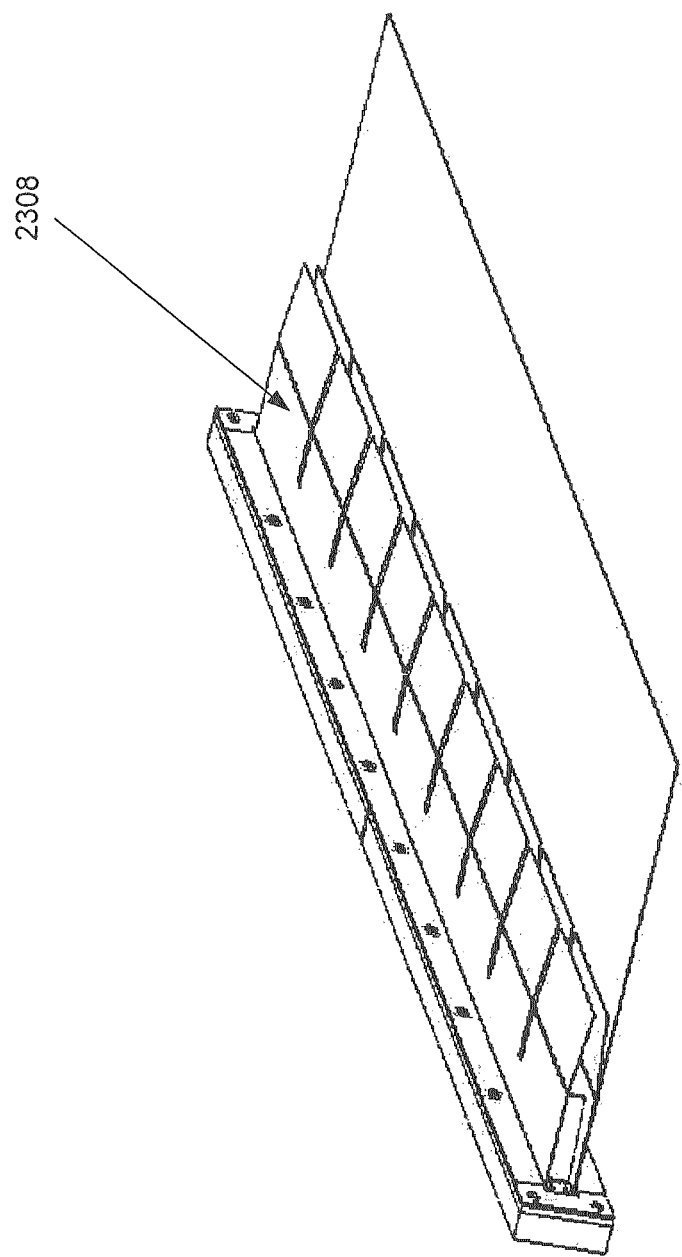
FIG. 22 details the dust seal of the multiple-finger carrier ram of the gasifier illustrated in FIGS. 11 to 16.
Figure 23:
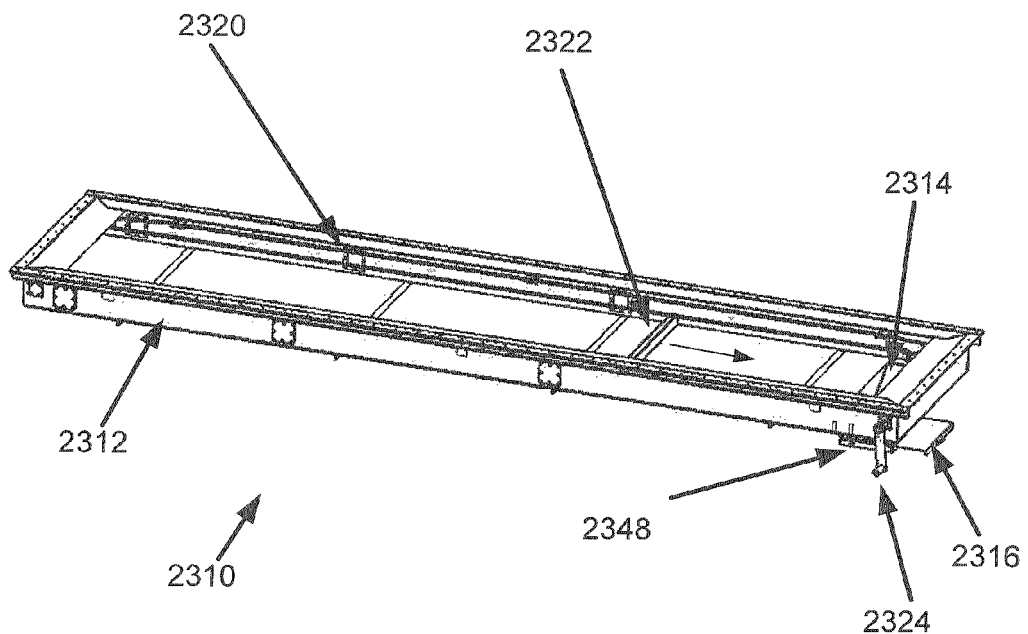
FIG. 23 showing the dust removal system of one embodiment of the gasifier illustrated in FIGS. 11 to 16 detailing the dust pusher, dust can attachment, shutter, operator handle and chain mechanism.

Referring to FIG. 21, the downstream edge of the air box can be dealt with in the same way. The upstream edge of the air box is sealed with a resilient sheet sealing (2306) between the ram and the air box top plate (2302).

Connection to the hot air supply piping is via a horizontal flange such that to enable removal of an air box requires only the flange to be disconnected to permit the removal to take place.

Figure 19:
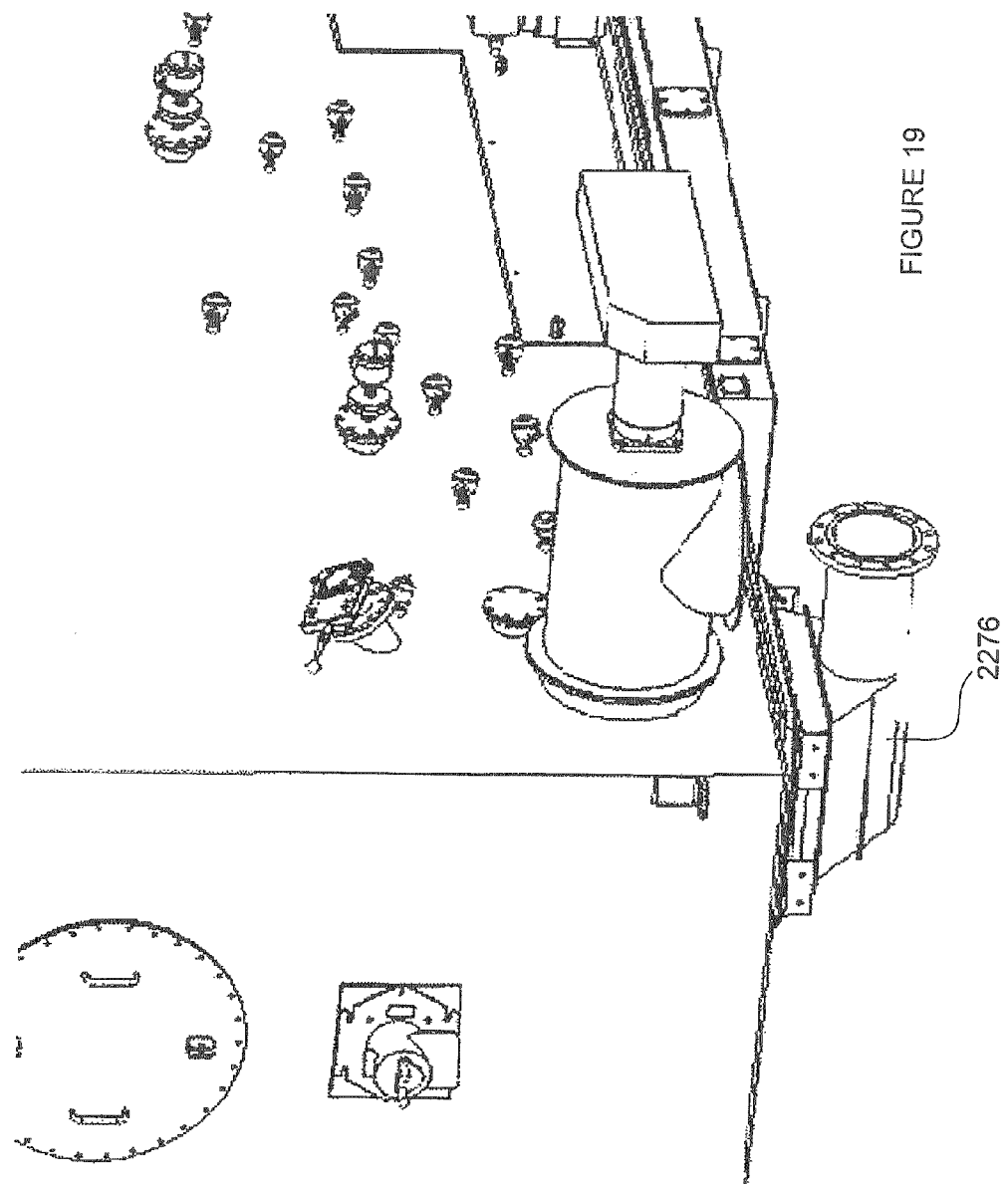
FIG. 19 illustrates a side view of the outside of the gasifier of FIGS. 11 to 16 detailing the Step C air box and ash screw extrator.
Figure 20:
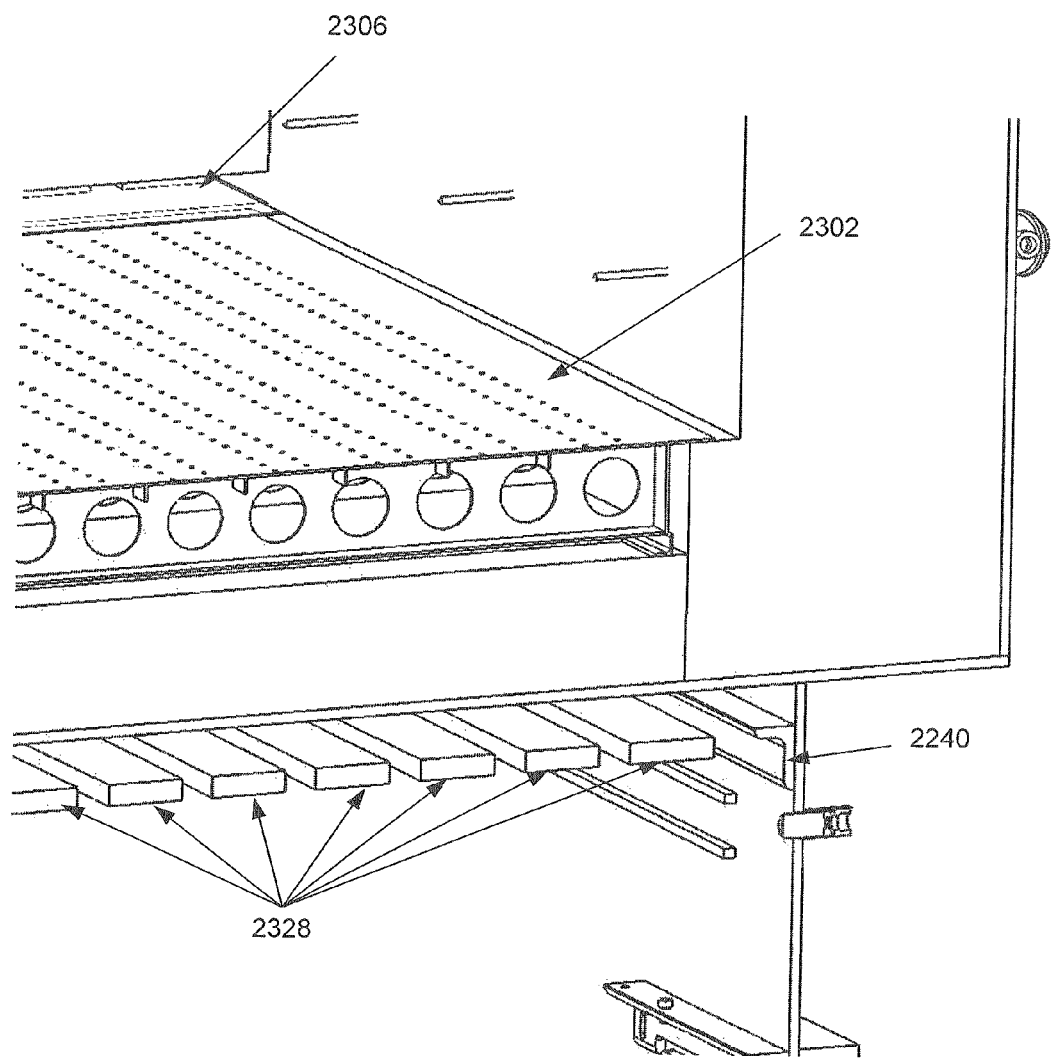
FIG. 20 illustrates a cross sectional view of the gasifier of FIGS. 11 to 16 detailing an air box.

The third step air box (2276) is inserted from below and uses the shroud concept for sealing and locating the box to the gasifier (2200). The general arrangement of the third step air box is shown in FIG. 19.

Sealing against dust falling around the edges of the third stage box is achieved by having it set underneath a refractory ledge at the edge of the second stage. The sides can be sealed by flexible seals protruding from below recesses in the sides of the refractory. These seals sit on the top face of the box, sealing between the walls and the box. The downstream edge of the air box is dust sealed to the side of an extractor trough using a flexible seal.

To permit removal of the third stage air box, the hot air pipe connection is vertical.

Figure 24:
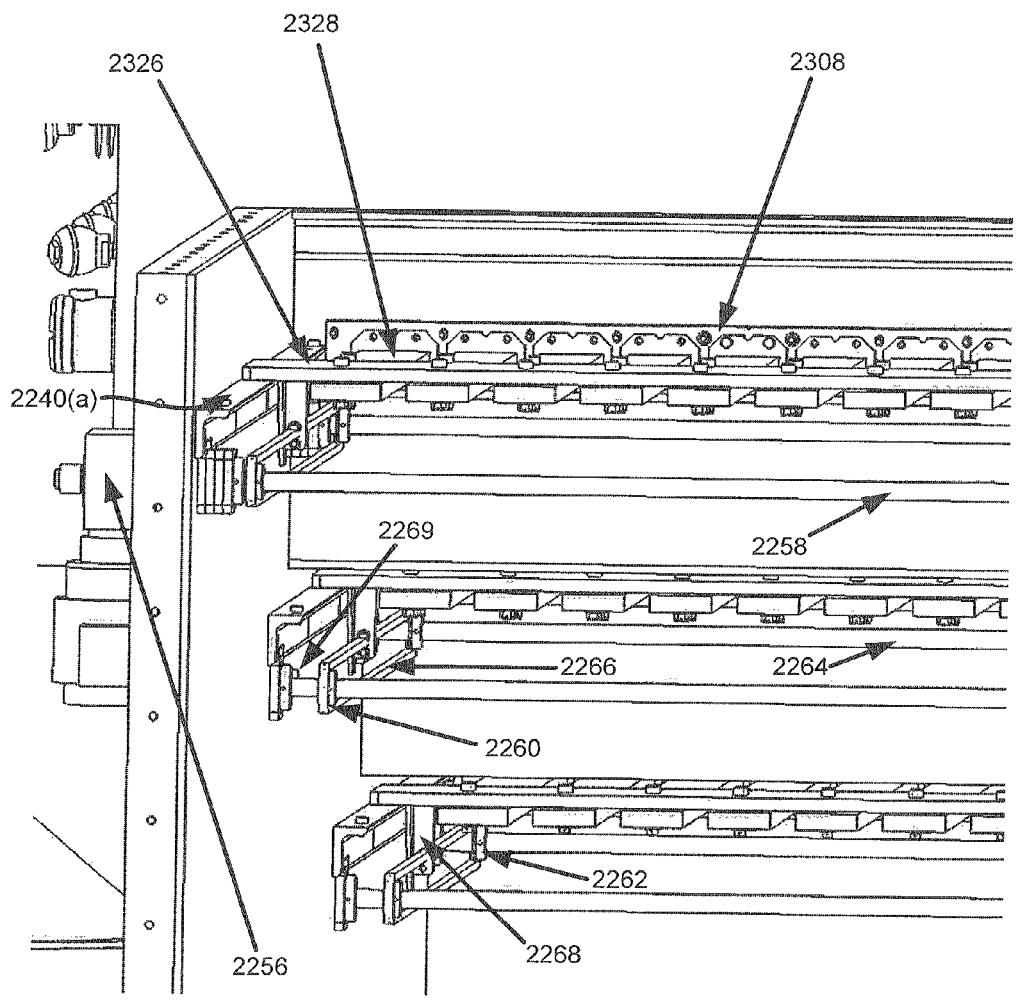
FIG. 24 details the ram enclosure of the gasifier illustrated in FIGS. 11 to 16 detailing a portion the lateral transfer unit structure.
Figure 25:
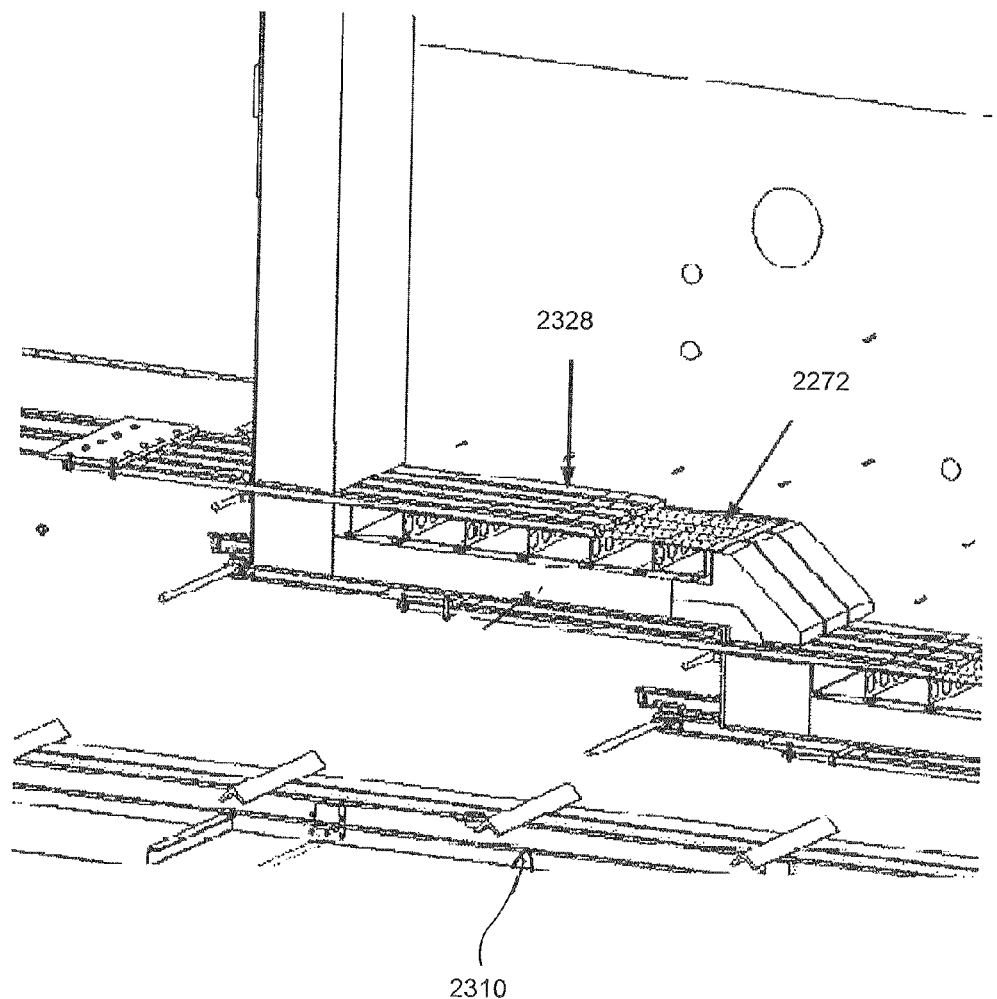
FIG. 25 details the multiple-finger carrier ram setup at Step 1 of the gasifier illustrated in FIGS. 11 to 16.

Movement through the steps is facilitated by lateral transfer system. Referring to FIGS. 24 to 25, in this Example, the lateral transfer system comprises a series of multiple-finger carrier rams (2228, 2230, 2232), with a single multiple-finger carrier ram servicing each step. The system of carrier rams further allows for the control of the height of the pile at each step and the total residence time in the chamber. Each carrier ram is capable of movement over the full or partial length of that step, at variable speeds.

Referring to FIG. 24, each carrier ram unit comprises an externally mounted guide portion, a multiple-finger carrier ram, externally mounted drive system and an externally mounted controller.

The multiple-finger carrier ram is a structure in which fingers (2328) are attached to a ram body (2326), with individual fingers being of different widths depending on location. The gap between the fingers in the multiple-finger carrier design is selected to avoid particles of reactant material from bridging. The individual fingers are about 2 to about 3 inches wide, about 0.5 to about 1 inch thick with a gap between about 0.5 to about 2 inches wide.

The air box airhole pattern is arranged such that operation of the rams does interfere with the air passing through the airholes.

The multiple-finger carrier ram has independent flexibility built-in so that the tip of each finger (2328) can more closely comply with any undulations in the air box top face. This compliance has been provided by attaching the fingers (2328) to the ram body (2326) using shoulder bolts, which do not tighten on the finger. This concept also permits easy replacement of a finger.

The end of the ram finger is bent down to ensure that the tip contacts the top of the air in the event that the relative locations of the ram and airbox change due, for example, to expansions. This feature also lessens any detrimental effect on the process due to air holes being covered by the ram, the air will continue to flow through the gap between the ram and air box.

Referring to FIGS. 24 and 25, the guide portion comprises a pair of generally horizontal, generally parallel elongated tracks (2240(*a*), 2240(*b*)) (not shown) mounted on a frame. Each of the tracks has a substantially L-shaped cross-section. The moving element comprises a ram body (2326) and a series of elongated, substantially rectangular ram fingers (2328) sized to slidably move through corresponding sealable opening in the chamber wall. The ram fingers are constructed of material suitable for use at high temperature.

The ram fingers are adapted to sealingly engage the chamber wall to avoid uncontrolled air from entering the gasifier, which would interfere with the process or could create an explosive atmosphere. It is also necessary to avoid escape of hazardous toxic and flammable gas from the chamber, also, excessive debris escape is undesirable. Gas escape to atmosphere is prevented by containing the ram mechanisms in a sealed box. This box comprises a nitrogen purge facility to prevent formation of an explosive gas mixture within the box. Debris sealing and limited gas sealing is provided for each finger of the ram. The sealing is in the form of a flexible strip (2308) pressing against each surface of each finger of the rams, see FIG. 22.

Leakage of debris is monitored by means of windows in the sealed box and a dust removal facility is provided to facilitate the removal of debris. This removal can be accomplished without breaking the seal integrity of the ram box, see FIG. 23.

The dust removal facility (2310) comprises a metal tray (2312) having a dust outlet (2314) equipped with a shutter (2316) and attachment site (2318) for a dust can (2332), and a manual-operated, chain (2320) driven dust pusher (2322). Dust is pushed to the outlet (2314) by the pusher (2322) when the operator handle (2324) is used.

Power for moving the rams is provided by electric motors which drive the ram via a gearbox and roller chain system (as described in Example 1). Briefly, power to propel the rams along the tracks is supplied by a externally mounted electric variable speed motor (2256) which drives a motor output shaft (2258) selectably in the forward or reverse direction allowing for extension and retraction of the ram at a controlled rate. A position sensors (2269) transmit ram position information to the control system. Two driver sprocket gears (2260) are mounted on the motor output shaft. The driver sprockets (2260) and corresponding driven sprockets (2262) mounted on an axle (2264) operatively mesh with chain members (2266) which are secured by brackets (2268) to the elongated rectangular block (2244).

The motors are controlled by the overall control system which can command start and stop position, speed of movement and frequency of movement. Each ram is controlled independently. There is a tendency for the material on top of the ram to be pulled back when the ram is withdrawn. This tendency is dealt with by appropriately sequencing the ram strokes.

Example 3

Figure 26:
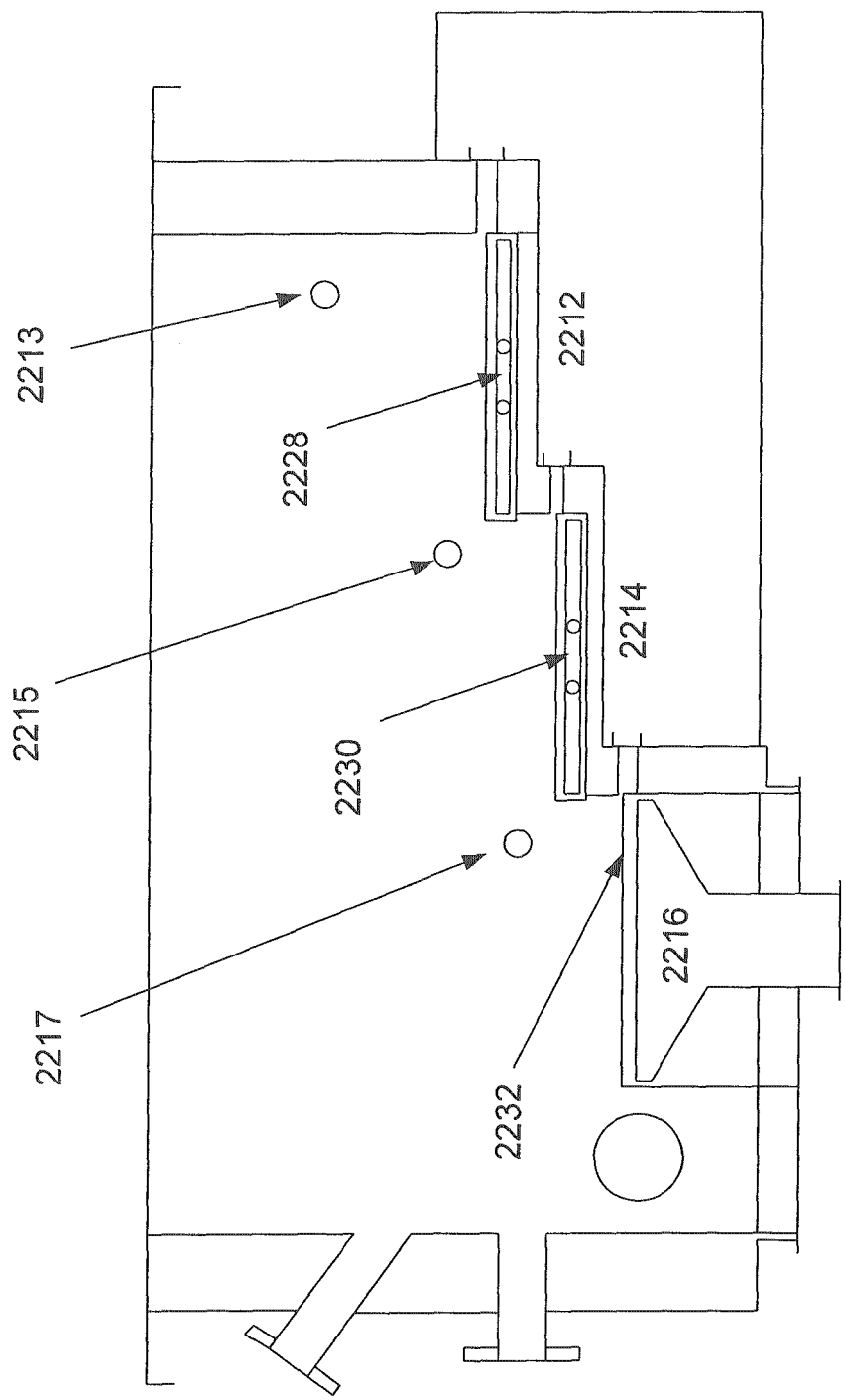
FIG. 26 is an illustration detailing the level switch locations in one embodiment of the invention.

Referring to FIG. 26, in the embodiment of the invention described in Example 2 a staggered ram sequence control strategy can be implemented to facilitate movement of the rams. A summary of an exemplary ram sequence is as follows:

1. Ram C (2232) move fixed distance (with adjustable setpoint), creating a pocket at the start of Step C (2216).
2. Ram B (2230) follows as soon as Ram C (2232) passes a trigger distance (trigger distance has adjustable setpoint). Ram B pushes/carries material to immediately fill the pocket at the start of Step C (2216). Feedback control is to stroke as far as necessary to block level switch C (2217), or minimum setpoint distance if already blocked, or maximum setpoint distance if blocking does not occur. At the same time as Ram B (2230) is filling the pocket at the start of Step C (2216), it is creating a pocket at the start of Step B (2230).
3. Ram A (2228) follows as soon as Ram B (2228) passes a trigger distance. Ram A (2228) pushes/carries material to immediately fill the pocket at the start of Step B (2214). Feedback control is to stroke as far necessary to block level switch B (2215), or minimum setpoint distance if already blocked, or maximum setpoint distance if blocking does not occur. At the same time as Ram A (2228) is filling the pocket at the start of Step B (2214), it is also creating a pocket at the start of Step A (2212). This typically triggers the feeder to run and fill the gasifier until level switch A (2213) is blocked again.
4. All rams reverse to home position simultaneously.

Figure 27:
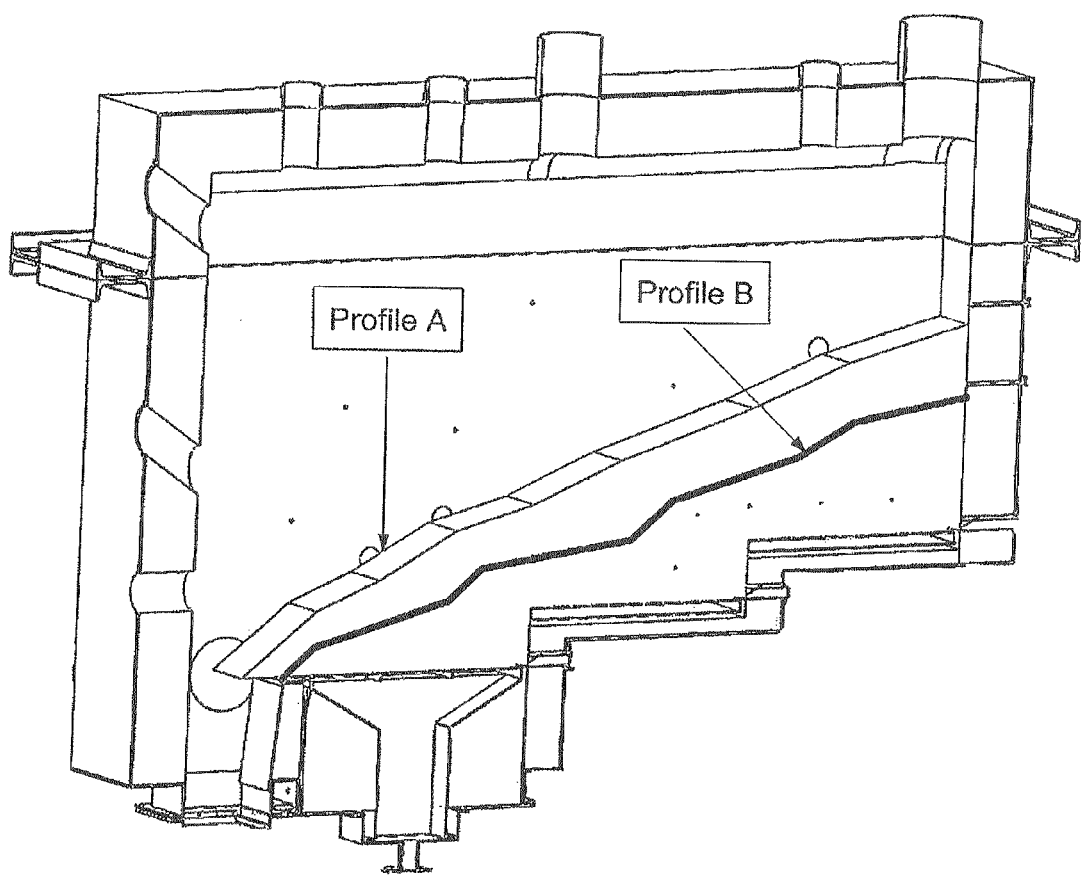
FIG. 27 is an illustration detailing two reactant material pile profiles for the gasifier of Example 2, according to an embodiment of the invention.
Figure 29:
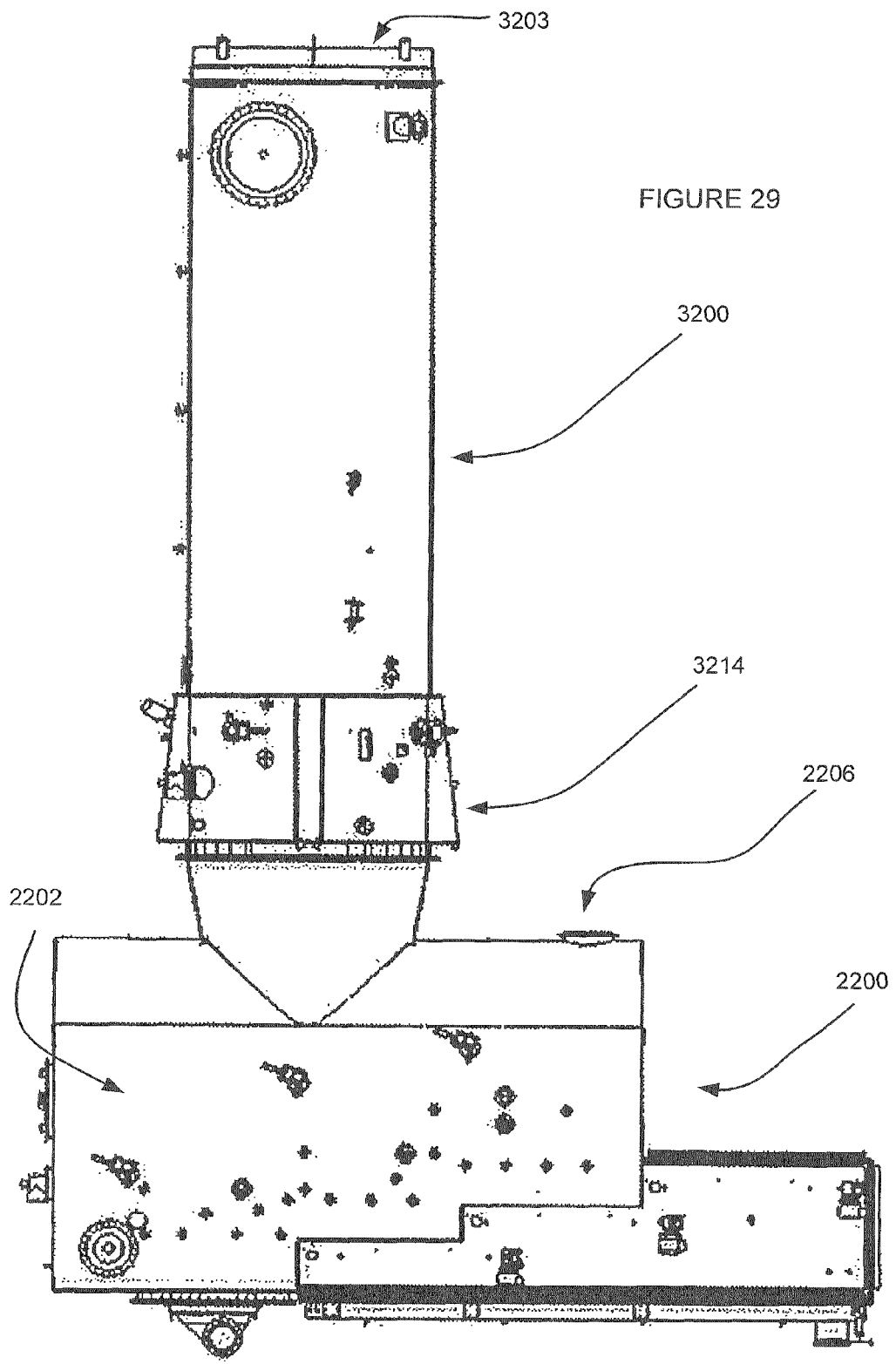
FIG. 29 is an illustration of the gasifier of Example 2 coupled to a gas reformulating chamber.
Figure 30:
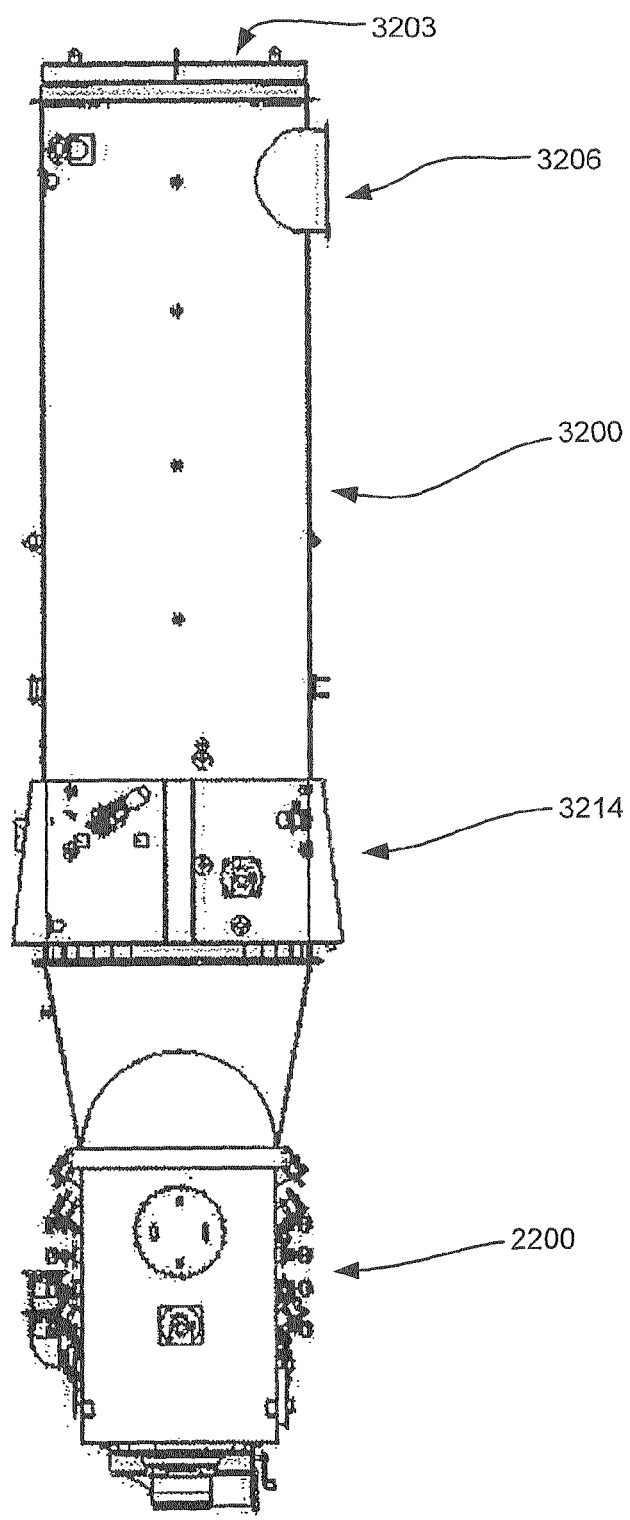
FIG. 30 is an alternative view of the gasifier of Example 2 coupled to a gas reformulating chamber.
Figure 31:
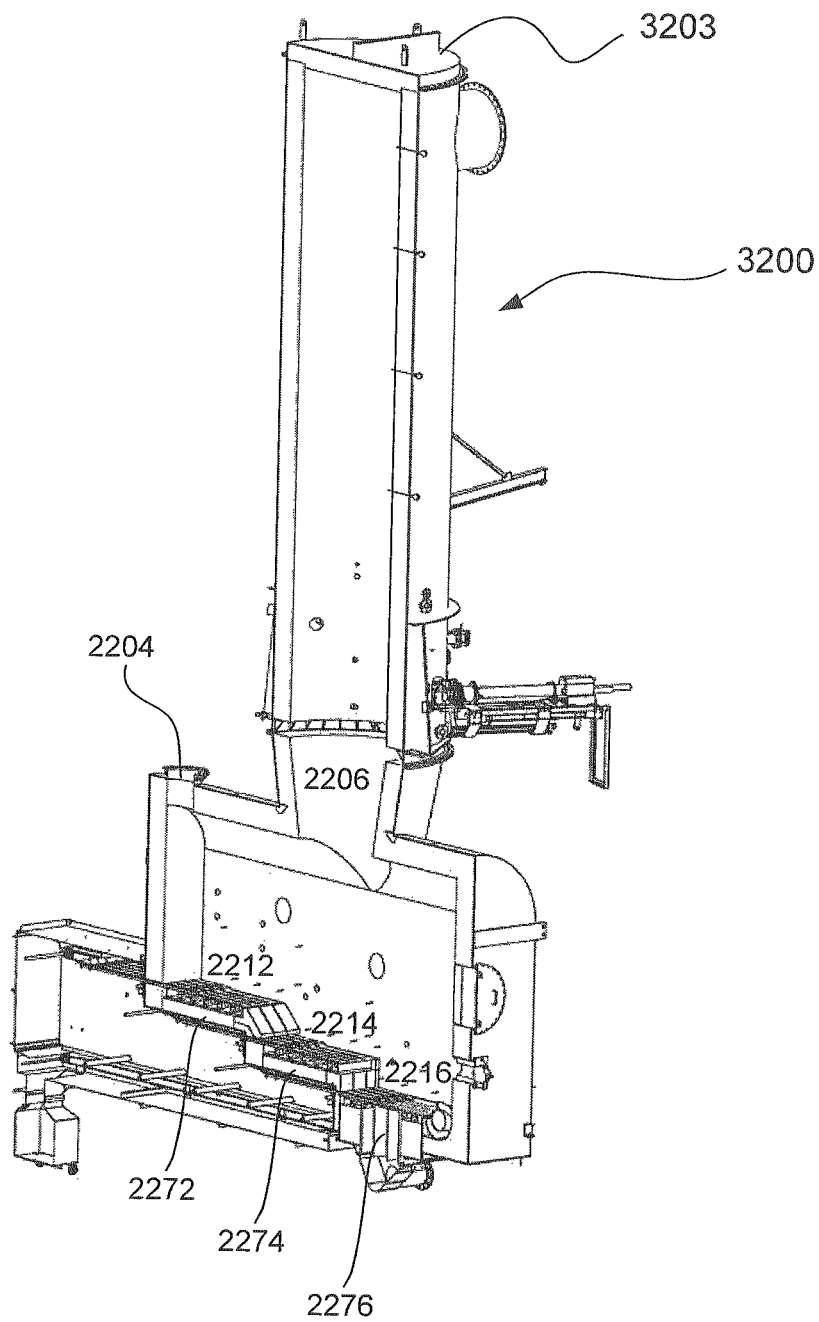
FIG. 31 is a cross sectional view of the gasifier of Example 2 coupled to a gas reformulating chamber detailing one plasma torch.
Figure 32:
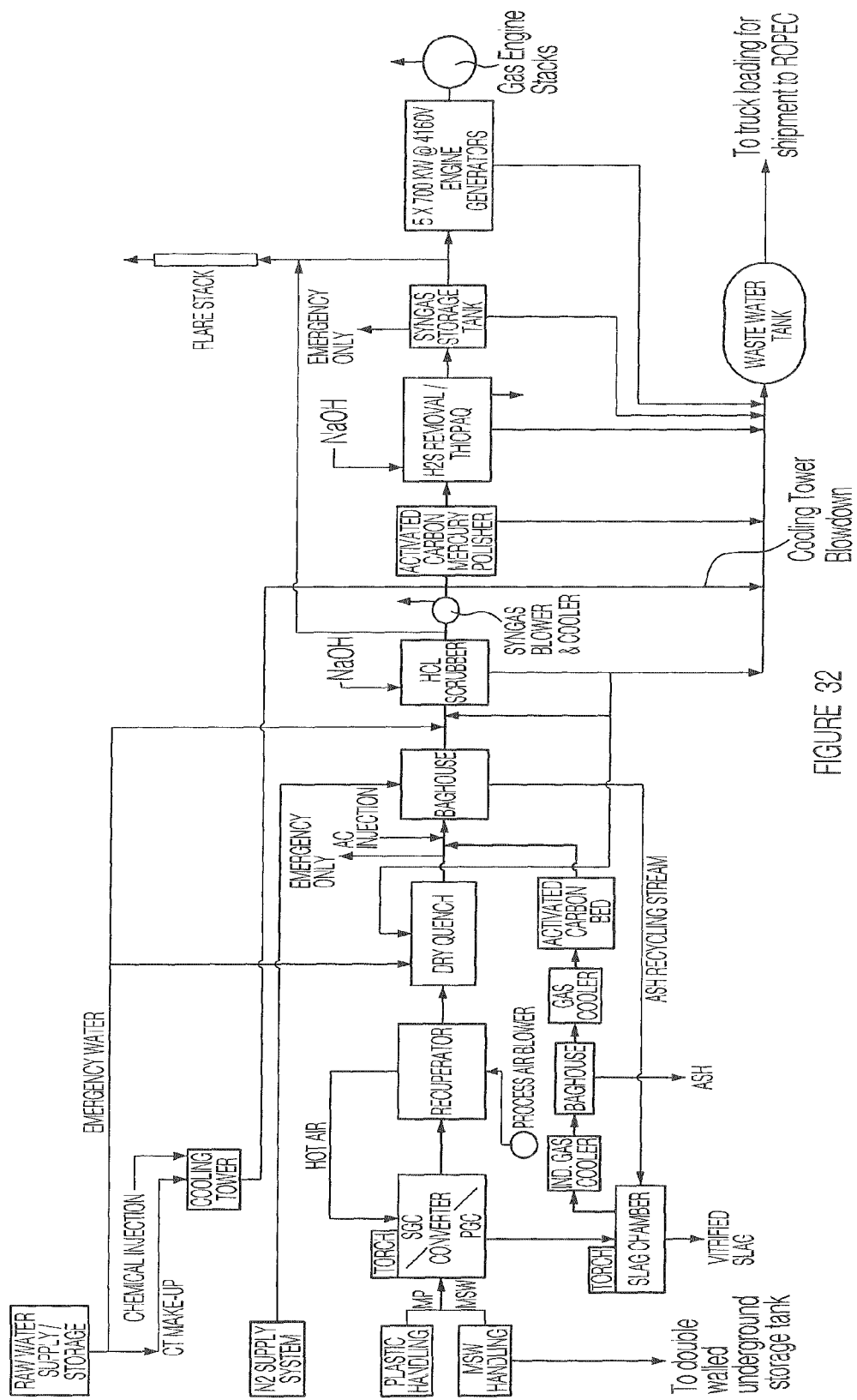
FIG. 32 is schematic showing the converter of FIGS. 29 to 31 incorporated into power plant.

The reactant material profile obtained by such a sequencing strategy is show in FIG. 27 (Profile B).

The embodiments of the invention in which an exclusive property or privilege is claimed are defined as follows:

1. A horizontally-oriented gasifier comprising:
   a horizontally-oriented, gasification chamber comprising three or more steps, one or more feedstock inputs, one or more gas outlets and a solid residue outlet;
   a chamber heating system comprising three or more independently controlled air boxes, wherein each step is provided with an independently controlled air box for each step of the three or more steps;
   three or more lateral transfer units for moving material through the gasification chamber during processing; wherein each step is provided with a lateral transfer unit and wherein each lateral transfer unit comprises a ram configured to push reactant material along and over a step;
   one or more pile height sensors operatively associated with the gasification chamber;
   and a plurality of temperature sensors operatively associated with the gasification chamber; and
   a control system configured to receive signals from the one or more pile height sensors and configured to control the sequence of ram movement, speed of each ram, and the distance each ram moves in response to the signals from the one or more pile height sensors;
   the control system further configured to receive signals from the plurality of temperature sensors and control air flow from the independently controlled air boxes to provide three or more laterally distributed regional temperature zones in response to the signals from the one or more temperature sensors, wherein a first regional temperature zone has a temperature that promotes drying, a second regional temperature zone has a temperature that promotes volatization and a third regional temperature zone has a temperature that promotes char-to-ash conversion.

2. The horizontally-oriented gasifier of claim 1, wherein the control system is configured to implement feedback control schemes.

3. The horizontally-oriented gasifier of claim 1, wherein the gasifier has three steps and each zone substantially corresponds to a step.

4. The horizontally-oriented gasifier of claim 1, wherein the control system comprises:
   A. one or more sensing elements configured to sense one or more characteristics of a process, a process device, a process input and/or process output;
   B. one or more response elements configured to affect one or more characteristics of one or more processes within the system; and
   C. one or more computing platforms operatively associated with one or more of the sensing elements and one or more of the response elements, the one or more computing platforms configured to receive input signals from at least one sensing element and to provide control signals to at least one response element to either maintain or adjust a process characteristic within the system.

5. The horizontally-oriented gasifier of claim 1, wherein the pile height sensors are level switches.

6. The horizontally-oriented gasifier of claim 1, wherein the air boxes are configured to provide hot air to the base of the reactant pile.

7. The horizontally-oriented gasifier of claim 1, wherein at least one of the gas outlets is operatively associated with a gas reformulating system, a gas refinement system or a cyclonic oxidizer.

8. The horizontally-oriented gasifier of claim 1, wherein the control system is configured such that air flow to each step is pre-set to maintain substantially constant temperature ranges and ratios between steps.

9. The horizontally-oriented gasifier of claim 1, wherein each lateral transfer unit comprises an externally mounted controller thereby providing independent control of each lateral transfer unit.

10. The horizontally-oriented gasifier of claim 1, wherein each of the individual lateral transfer units comprises one or more guide elements and/or one or more alignment elements.

11. The horizontally-oriented gasifier of claim 1, comprising one or more process additive inputs.

12. The horizontally-oriented gasifier of claim 11, wherein the one or more process additive inputs are configured for inputting one or more of steam, air, oxygen-enriched air, an oxygen source and/or a carbon-rich additive into the gasifier.

13. The horizontally-oriented gasifier of claim 2, wherein the system is integrated into a gasification facility and the heating system utilises heat recovered from one or more locations within the gasification facility.

14. The horizontally-oriented gasifier of claim 1, wherein the horizontally-oriented gasifier comprises a controllable residue removal means.

15. The horizontally-oriented gasifier of claim 14, wherein the controllable residue removal means comprises a ram mechanism, a system of conveying rams, or a rotating arm mechanism to push residue comprising ash out of the gasifier.

16. The horizontally-oriented gasifier of claim 1, operatively associated with a solid residue conditioning system and a plasma refinement system.

17. The horizontally-oriented gasifier of claim 1, wherein the air boxes are configured to provide hot air through the floor of the gasifier.

18. The horizontally-oriented gasifier of claim 1, wherein each step is operatively associated with at least one pile height sensor.

19. The horizontally-oriented gasifer of claim 1, comprising proximity or position sensors and wherein the ram stokes are controlled in part by signals from said proximity or position sensors.

20. The horizontally-oriented gasifier of claim 1, wherein each ram is a multiple-finger ram.

21. The horizontally-oriented gasifer of claim 20, wherein each lateral transfer unit is configured such that the ram can be fully or partially withdrawn from the gasification chamber.

* * * * *